US006012604A

United States Patent [19]

Takahashi et al.

[11] Patent Number: 6,012,604

[45] Date of Patent: Jan. 11, 2000

[54] ARTICLE EJECTING DEVICE OF AUTOMATIC VENDING MACHINE

[75] Inventors: Yutaka Takahashi, Fujisawa; Hisashi Funakoshi, Sagamihara, both of Japan

[73] Assignee: F.I.C., Inc., Tokyo-to, Japan

[21] Appl. No.: 09/043,101

[22] PCT Filed: Aug. 21, 1997

[86] PCT No.: PCT/JP97/02906

§ 371 Date: Apr. 21, 1998

§ 102(e) Date: Apr. 21, 1998

[87] PCT Pub. No.: WO98/08200

PCT Pub. Date: Feb. 26, 1998

[30] Foreign Application Priority Data

Aug. 23, 1996 [JP] Japan .................................... 8-222382

[51] Int. Cl.[7] ............................. G07F 11/16; B65G 59/00

[52] U.S. Cl. ..................... 221/242; 221/241; 221/312 R; 193/32

[58] Field of Search .................................... 221/241, 242, 221/289, 298, 312 R, 311; 193/32, 40

[56] References Cited

U.S. PATENT DOCUMENTS

| | | | |
|---|---|---|---|
| 3,158,245 | 11/1964 | Budjinski et al. | 193/32 |
| 3,338,470 | 8/1967 | Newberry | 221/67 |
| 3,361,505 | 1/1968 | Newberry | 312/45 |
| 3,362,582 | 1/1968 | Gasparini | 221/298 |
| 3,464,529 | 9/1969 | Horsky | 193/32 |

FOREIGN PATENT DOCUMENTS

| | | | |
|---|---|---|---|
| 0165617 | 6/1985 | European Pat. Off. . | |
| 5996682 | 6/1984 | Japan . | |
| 0030091 | 2/1991 | Japan | 221/241 |
| 404042392 | 2/1992 | Japan | 221/214 |
| 404052998 | 2/1992 | Japan | 221/312 R |
| 404074297 | 3/1992 | Japan | 221/242 |
| 404291493 | 10/1992 | Japan | 221/242 |
| 405089350 | 4/1993 | Japan | 221/312 R |
| 7262450 | 10/1995 | Japan . | |
| 991564 | 4/1997 | Japan . | |

OTHER PUBLICATIONS

Patent Abstracts of Japan of JP 04042392 dated Feb. 12, 1992.

Patent Abstracts of Japan of 07220154 dated Aug. 18, 1995.

*Primary Examiner*—H. Grant Skaggs

*Attorney, Agent, or Firm*—Ladas & Parry

[57] ABSTRACT

An article dispensing device is incorporated into an automatic vending machine capable of storing articles having a cylindrical or substantially cylindrical shape resembling bottles or cans in stacks, and of dispensing the articles in response to a dispensation command. The article dispensing device has a fixed plate serving as a wall defining an article dispensing passage, and holding a dispensing mechanism for dispensing the articles one at a time, and a movable unit disposed opposite to the fixed plate. The movable unit has a frame attached to the body of the automatic vending machine, a shiftable plate supported on the side walls of the frame by pivot pins fitted in slots formed respectively in the side walls and provided with a positioning projection projecting from at least one end thereof so as to engage with steps of a stepped positioning edge formed in the side wall selectively according to the diameter of the article passing through the dispensing passage. A biasing means for biasing the shiftable plate is provided so that a lower end portion of the shiftable plate protrudes into the dispensing passage.

12 Claims, 18 Drawing Sheets

ARTICLE EJECTING DEVICE OF AUTOMATIC VENDING MACHINE

TECHNICAL FIELD

The present invention relates to an automatic vending machine for vending articles, such as bottled or canned beverages and, more particularly, to an article dispensing device for an automatic vending machine separately storing a plurality of kinds of articles differing in diameter from each other, and having dispensing passages of widths respectively conforming to the articles to dispense the articles smoothly.

BACKGROUND ART

Automatic vending machines have come into wide use in recent years in the fields of various commercial items. The diffusion of automatic vending machines for vending bottled beverages and canned beverages is particularly remarkable and consumers are able to buy bottled beverages and canned beverages easily any time they want. Although bottles and cans containing beverages have different outside diameters, respectively, most of the bottled and the canned beverages can be vended by automatic vending machines.

Incidentally, a dispensing passage of an automatic vending machine suitable for passing an article will be clogged if an article having a diameter greater than that of the article for which the dispensing passage is designed is delivered into the dispensing passage and, if an article having a diameter smaller than that of the article for which the dispensing passage is designed is delivered into the dispensing passage, the article will pass through the dispensing passage, drops and it is possible that many articles are discharged accidentally at a time.

Accordingly, if articles to be vended by the automatic vending machine are changed and new articles having an outside diameter different from that of the articles which have been vended are to be vended by the automatic vending machine, the width of the dispensing passage must be changed to a width conforming to the outside diameter of the new articles.

Referring to FIG. 19, when changing the width of each of dispensing passages 3 connected to the lower ends of divisional passages 2, an exit plate 4 disposed behind the dispensing passage 3 is moved by hand or the exit plate 4 is replaced with another exit plate having a thickness different from that of the exit plate 4 to adjust the width of the dispensing passage properly.

Generally, the dispensing passage 3 is defined by a fixed plate 6 holding a dispensing mechanism 5 capable of dispensing articles A one at a time and fixed to the body of the automatic vending machine, and a exit plate 4 disposed opposite to the fixed plate 6. As shown in FIG. 20, the exit plate 4 is held in place by fitting pins 7 and 8 projecting from the opposite sides of an upper end portion and a lower end portion thereof in positioning slots 9 and 10. The plurality of lower positioning slots 10 are formed in a shape resembling the inverted letters U at positions respectively corresponding to the diameters of articles. The plurality of upper positioning slots 9 are formed continuously in a shape resembling continuous cranks. The exit plate 4 disposed at a position a, b, c or d conforming to the outside diameter of the articles A by placing each of the lower pins 8 in the bottom of one of the positioning slots 10.

Referring to FIG. 21, in another automatic vending machine, the exit plate 4 is supported so as to be moved to either of two positions corresponding to the positions b and d shown in FIG. 20. As illustrated in FIGS. 22A and 22B, an width adjusting plate 11 is attached to the exit plate 4 by engaging hooks 12 formed by raising portions thereof so as to project from the back surface thereof with holes formed in the exit plate 4, the exit plate 4 thus provided with the width adjusting plate 11 is disposed at the position corresponding to the position b shown in FIG. 20 to set the width adjusting plate 11 at a position corresponding to the position a shown in FIG. 20 for an article $A_1$ having a minimum diameter (FIG. 22A), and the exit plate 4 provided with the width adjusting plate 11 is disposed at the position corresponding to the position d shown in FIG. 20 to set the width adjusting plate 11 at a position corresponding to the position c shown in FIG. 20 for an article $A_3$ having a medium diameter (FIG. 22B).

The replacement of articles having a diameter with those having a different diameter is executed frequently every year when replacing hot articles with cold articles and vice versa, when a new item is introduced into the market and when replacing articles which are in good demand with those which are not in much demand. and the width of the passages must be adjusted every time the articles are changed. The adjustment of the width of the passages requires heavy work because operations for changing the width of the passages are carried out by touch in a stained position in the lower portion of the automatic vending machine as shown in FIG. 19.

Since the result of width adjustment cannot be visually confirmed, the ratio of cases where correct width adjustment cannot be achieve is very high. Therefore, only limited operators are able to operate the automatic vending machine under the present circumstances. Accordingly, the width adjusting function is rarely used, the width of the passage is kept fixed in most cases, and the width adjusting function is kept idle.

The number of the automatic vending machines for vending beverages on the domestic market of Japan estimated by the related trade is well over 2,500,000 and the commercial useful life of the automatic vending machines is in the range of about five years to about seven years. Therefore, the old automatic vending machines are replaced with new ones every year at a considerably high ratio. However, the width adjustment of the passages is necessary because the rest of the automatic vending machines are used continuously for the rest of their useful lives. Particularly, when changing articles at the turn of the seasons, the width of the passages of many automatic vending machines must be changed in a short period. Therefore automatic vending machine makers need a huge sum of money to secure and train the personnel necessary for width adjustment and to repair automatic vending machines clogged with articles having inappropriate diameters loaded into the automatic vending machines by mistake.

Prior arts intended for alleviating difficulties in carrying out the work for width adjustment are proposed in JP-A No. 7-21457 (cited reference 1) and JP-A No. 7-160941 (cited reference 2).

The prior art disclosed in the cited reference 1 operates temporary stopping flaps for small-diameter cans and large-diameter cans by solenoid actuators to make the width of the passages conform to the size of articles. The prior art disclosed in the cited reference 2 adjusts first to third stoppers by solenoid actuators to make the width of the passages conform to the size of articles.

Both those prior arts are applicable only to automatic vending machines which vends articles of limited sizes and is not applicable to automatic vending machines which vends various articles of different outside diameters. The prior art which operates the flaps has difficulty in adjusting the relation between the solenoid actuators and the flaps, and troubles are liable to be caused by the unsatisfactory relation between the solenoid actuators and the flaps.

DISCLOSURE OF THE INVENTION

The present invention has been made with an intention to facilitate the management of an automatic vending machine by omitting all the manual adjusting operations and making articles which are dispensed through a dispensing passage determine the width of the dispensing passage, and to provide a dispensing device capable of being easily incorporated into the dispensing passage of an existing automatic vending machine without requiring modification of the automatic vending machine and having the least necessary thickness along the width of the dispensing passage.

The present invention provides, as means for solving the foregoing problems, an article dispensing device for an automatic vending machine having a body and capable of storing articles having a cylindrical or substantially cylindrical shape resembling bottles or cans in stacks, and of dispensing the article in response to a dispensation command, comprising; a fixed plate serving as a wall defining an article dispensing passage, and holding a dispensing mechanism for dispensing the articles one at a time; a movable unit disposed opposite to the fixed plate; in which the movable unit comprises: a frame attached to the body of the automatic vending machine; a shiftable plate supported on side walls of the frame by pivot pins fitted in slots formed respectively in the side walls, and provided with a positioning projection projecting from at least one end thereof and so as to engage with one of steps of a stepped positioning edge formed in the side wall selectively according to the diameter of the article passing through the dispensing passage; and a biasing means for biasing the shiftable plate so that a lower end portion of the shiftable plate protrudes into the dispensing passage.

Preferably, the slots are inclined downward away from the fixed plate to make the height of the steps of the stepped positioning edge big. It is desirable to dispose a shock absorbing means for absorbing shocks that may be exerted by an accelerated dropping article and for guiding the article toward the fixed plate in an upper portion of the frame.

It is preferable to employ two shiftable plates disposed one above the other to further ensure defining the passage. When two shiftable plates are employed, it is desirable that the lower shiftable plate has a big height, the lower shiftable plate is provided with pairs of positioning lugs in an upper portion and a lower portion thereof, and to form pairs of stepped positioning edges in an upper and a lower portion of the side walls of the frame. Although it is preferable that the height of the lower shiftable plate is greater than that of the upper shiftable plate, the height of the lower shiftable plate may be substantially equal to that of the upper shiftable plate.

The shock absorbing means may include a shock absorbing member which can move back when the circumference of the article comes into contact with it. The shock absorbing member may be provided with pivot pins at its opposite ends, may be supported on the opposite side walls of the frame by slidably fitting the pivot pins in guide slots formed in the opposite side walls, and may be resiliently biased toward the fixed plate. This shock absorbing member does not need any vertical space, and is capable of absorbing shocks exerted thereon by the falling article and of guiding the article smoothly into the dispensing passage. The shock absorbing member may be provided with pivot pins at its opposite ends, and a recess capable receiving the pivot pin may be formed in an upper portion or a lower portion of one end of each guide slot on the side of the fixed plate or recesses capable of receiving the pivot pin may be formed in an upper and a lower portion of one end of each guide slot on the side of the fixed plate so that the shocks is absorbed by both a primary shock absorbing effect of an action to drive the pivot pins of the shock absorbing member out of the recesses by the shocks exerted on the shock absorbing member by the article and a secondary shock absorbing effect of an action to drive the pivot pins for movement along the guide slots. The shock absorbing effect of the shock absorbing member will be further enhanced if a pneumatic shock absorbing bag for attenuating the acceleration of the dropping article perfectly so that only the weight of the article acts on the shock absorbing member is interposed between the shock absorbing member and a spring biasing the shock absorbing member.

Each of the slots for supporting the shiftable plate may be a straight slot having a bent portion in one end thereof on the side of the fixed plate or may be inclined stepped slot having steps corresponding to the steps of the stepped positioning edge to further ensure positioning of the movable unit.

The shock absorbing means may comprise a support plate extended between and pivotally supported on upper portions of the opposite side walls of the frame so as to extend obliquely upward toward the fixed plate, and a shock absorbing plate supported by a shaft on the free end of the support plate. If an upper end portion of the shiftable plate is connected by a shaft to a lower end portion of an inclined plate extended between and pivotally supported on upper portions of the side walls of the frame, the opposite ends of the connecting shaft are fitted for movement in inclined support slots formed in the side walls, and the shock absorbing plate is disposed so that its back surface is in contact with the circumference of the connecting shaft, the shock absorbing plate absorbs the acceleration of the dropping article, moving the shiftable plate to a predetermined position, and the shock absorbing plate guides the article smoothly to the dispensing passage so that the article can be dispensed stably.

BEST MODE FOR CARRYING OUT THE INVENTION

A first embodiment of the present invention will be described hereinafter with reference to the accompanying drawings.

Figure 1:
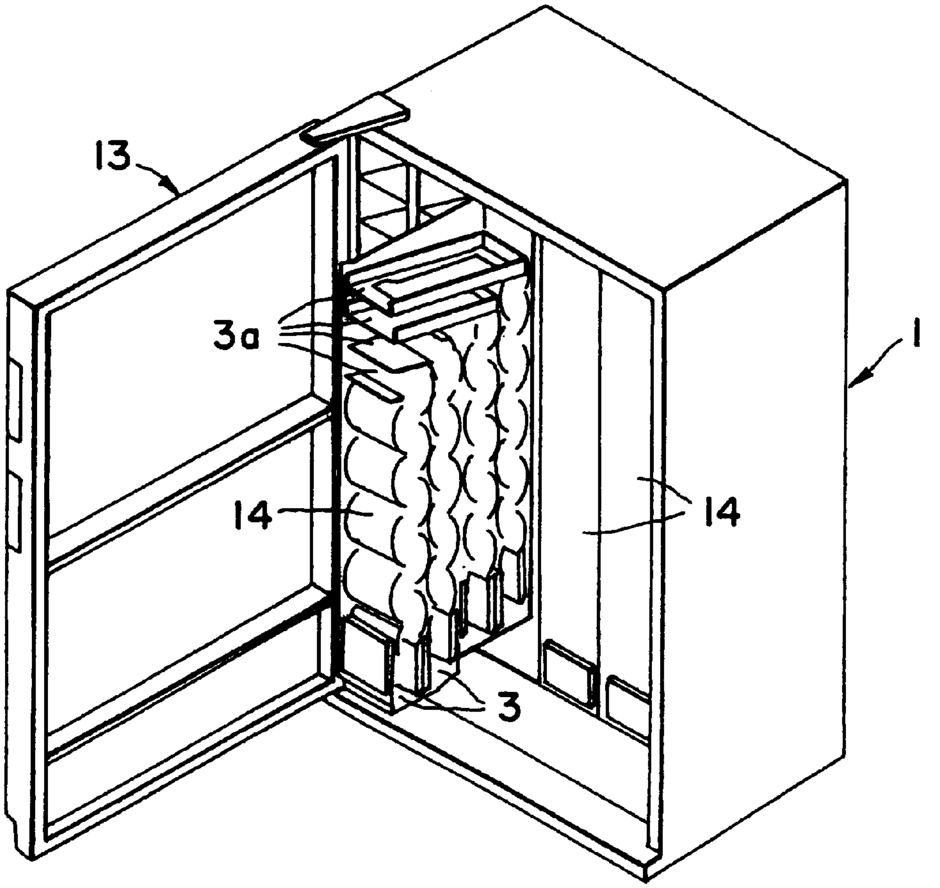
FIG. 1 is a perspective view of an automatic vending machine with its front door open to which the present invention is applied.
Figure 2:
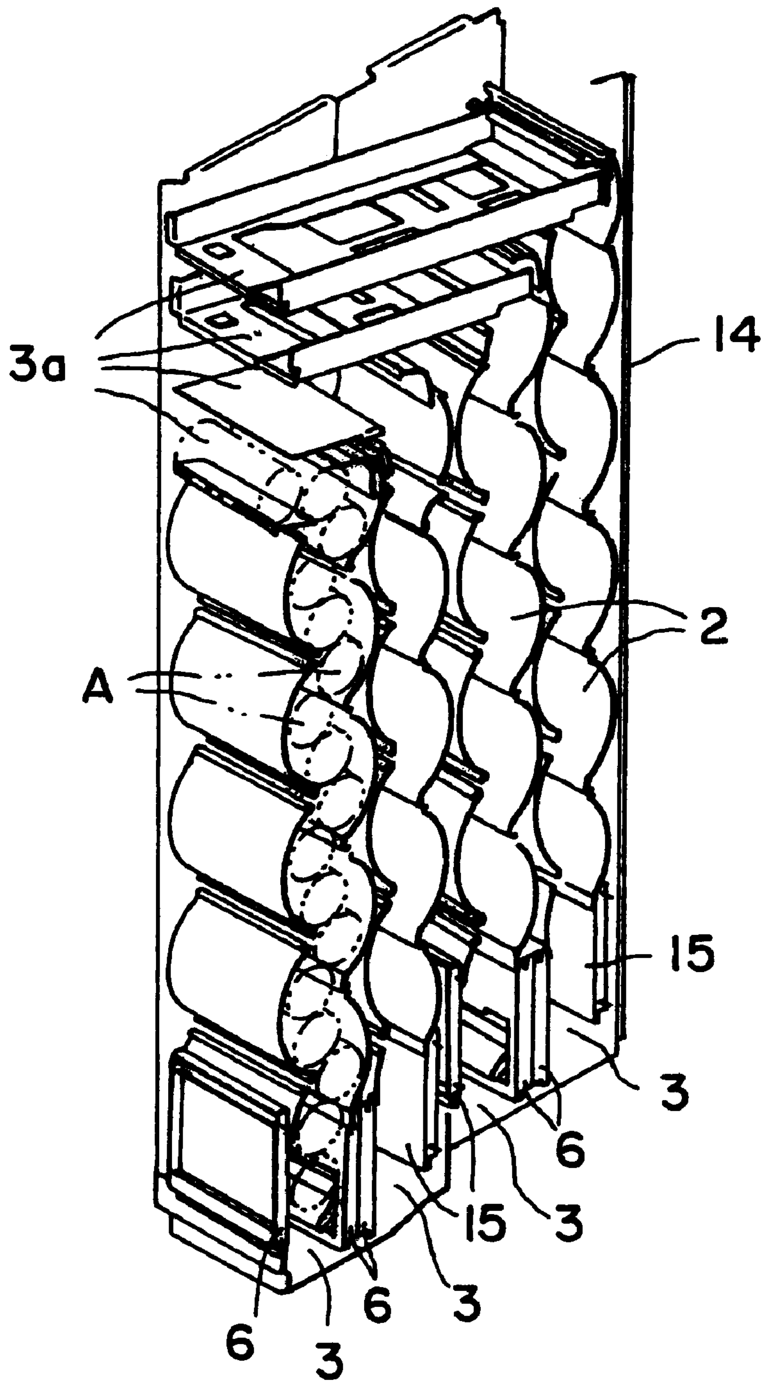
FIG. 2 is an enlarged perspective view of one of racks included in the automatic vending machine of FIG. 1.

FIG. 1 shows an automatic vending machine 1 to which the present invention is applied in a state where a front door 13 is open. A plurality of racks 14 as shown in FIG. 2 capable of being drawn out are installed in the automatic vending machine 1, and an article dispensing device of the present invention is disposed at the lower end of each of the racks 14.

Usually, four kinds of articles can be stored in each rack 14. Therefore, four article dispensing passages 3 are formed for the four kinds of articles. Article supply openings 3*a* are formed in an upper portion of the rack 14, and articles A are supplied through the article supply openings 3*a* into the article dispensing passages 3. The articles A are packed in zigzag passages 2.

Figure 3:
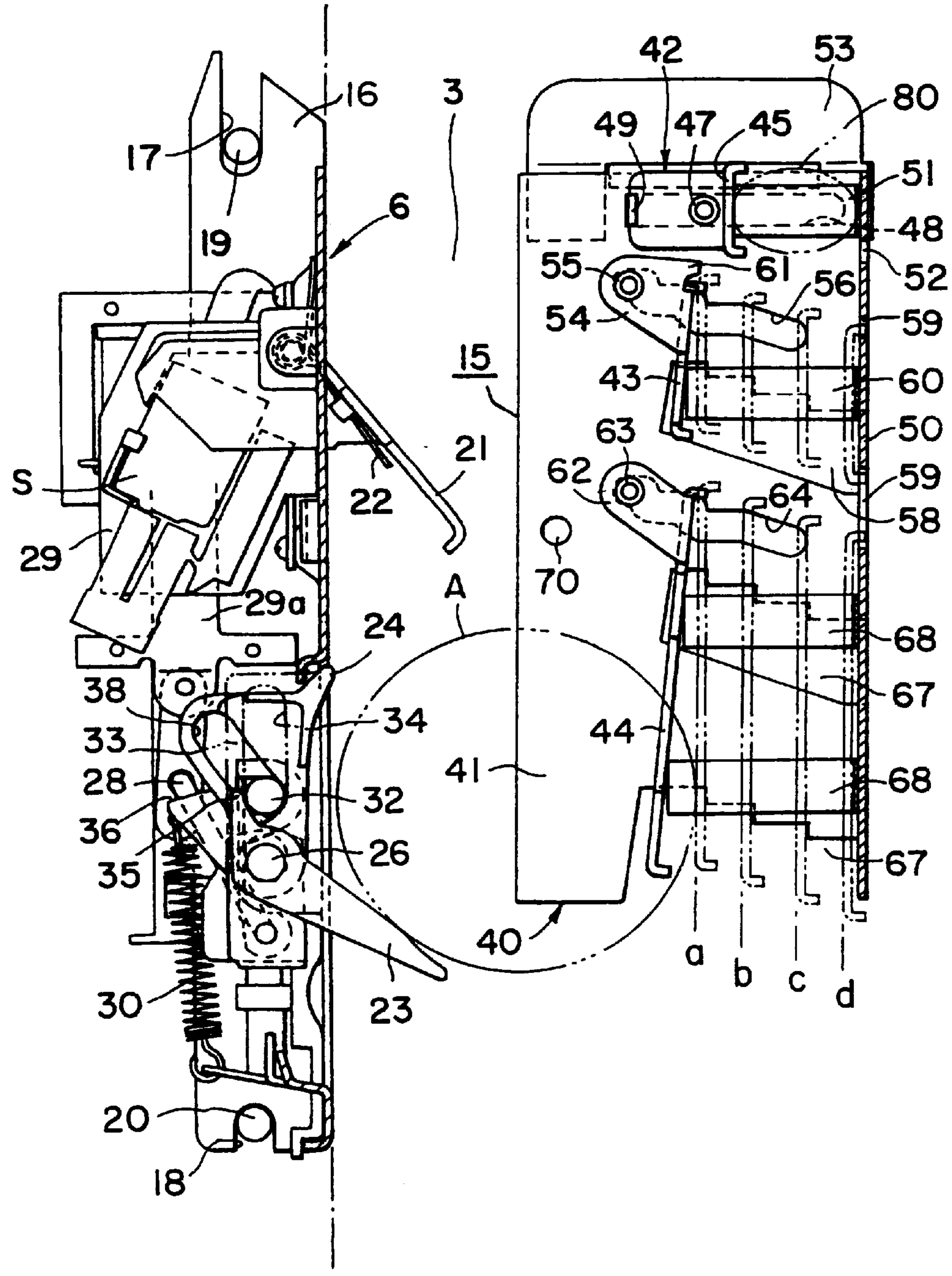
FIG. 3 is sectional view of an article dispensing device in a preferred embodiment according to the present invention.

FIG. 3 is a sectional view of one of the article dispensing passages 3. In FIG. 3, indicated at 6 is a fixed plate of a construction similar to that of the fixed plate of the conventional automatic vending machine, and at 15 is a movable unit in accordance with the present invention. The dispensing passage 3 through which the article A is dispensed is a space between the fixed plate 6 and the movable unit 15. Other two surfaces are defined by walls forming the body of the machine.

A conventional dispensing mechanism is supported on the fixed plate 6 having a thin, U-shaped cross section. The fixed plate 6 has side walls 16 formed by bending opposite side portions of a plate through a right angle. Hooks 17 and 18 are formed at the upper and the lower end of each of the side walls 16. The hook 17 is engaged from below with a fixed shaft 19 of the rack 14, and the lower hook 18 is engaged from above a shaft 20 of the rack 14.

Figure 4:
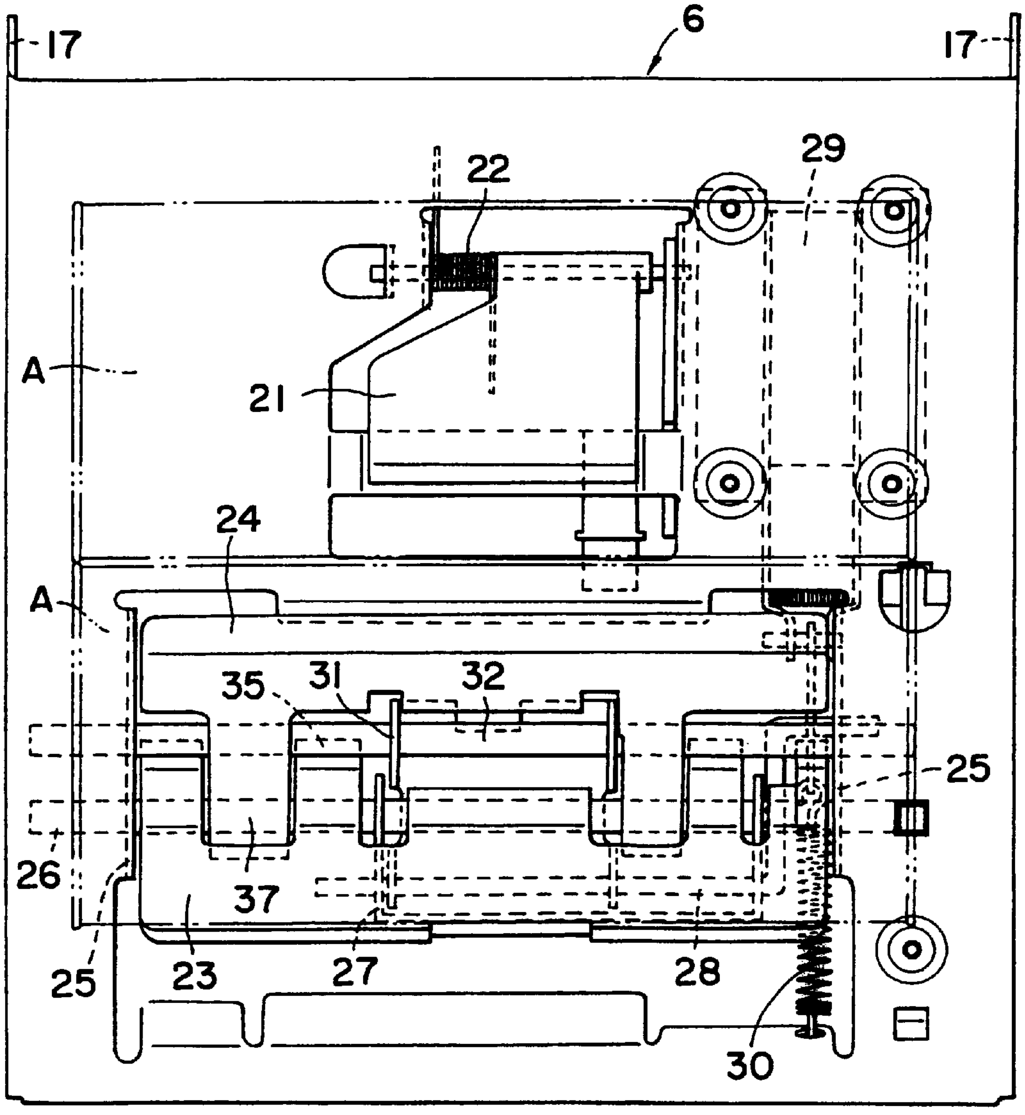
FIG. 4 is a front view of a fixed plate included in the article dispensing device of FIG. 3.
Figure 5:
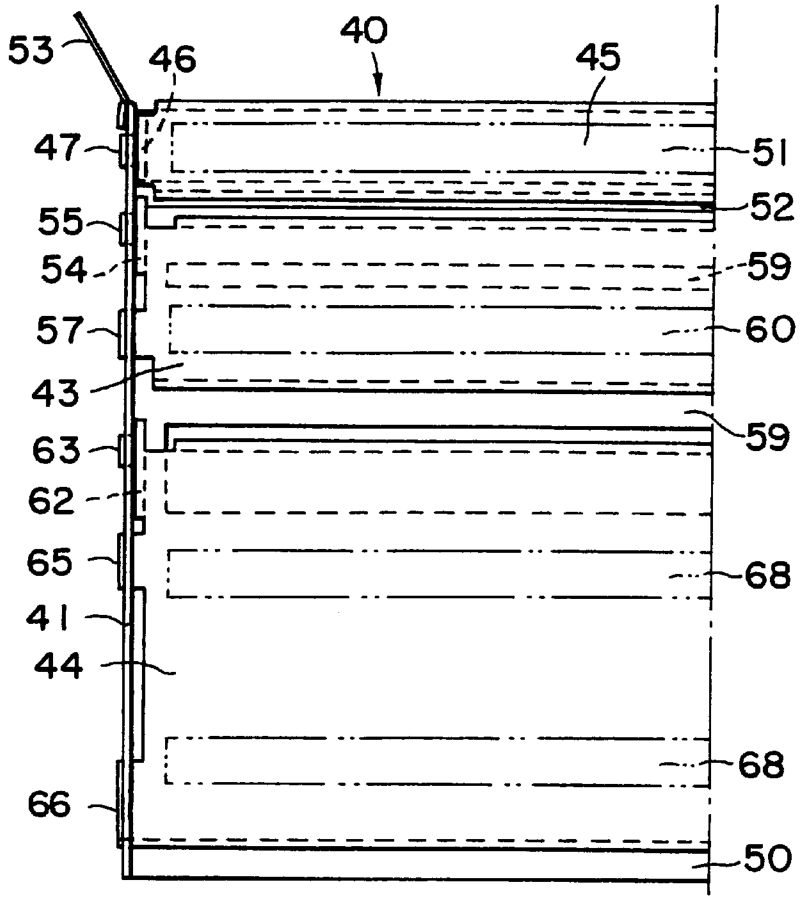
FIG. 5 is a half back view of a movable unit included in the article dispensing device of FIG. 3.
Figure 6:
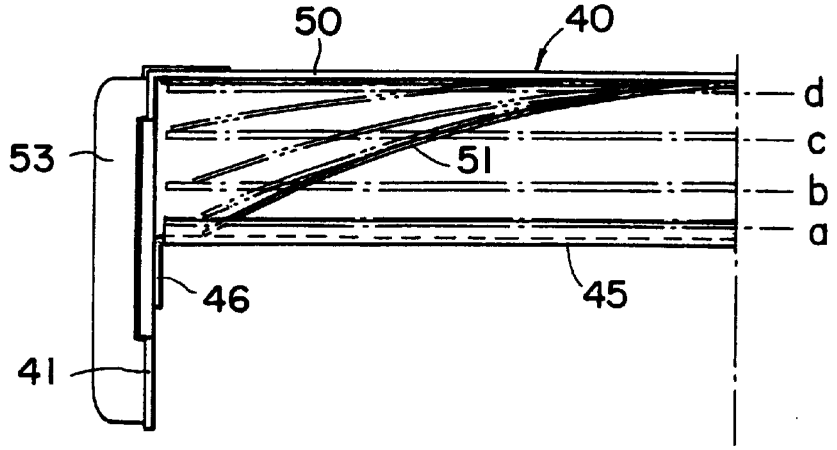
FIG. 6 is a half back view of a movable unit included in the article dispensing device of FIG. 3.

As shown in FIGS. 3 and 4, an exhaustion detecting arm 21 is supported for turning on an upper middle portion of the fixed plate 6 and is biased by a spring 22 so as to extend into the dispensing passage 3 as shown in FIG. 3. When the exhaustion detecting arm 21 projects in a state as shown in FIG. 3, i.e., when the passage 2 is empty, a switch S provides a sellout signal. When the switch S provides a sellout signal, a sellout indicating lamp, not shown, for indicating the sellout of the corresponding articles placed on the front door 13 is lighted.

An article dispensing plate 23 for catching the lowermost article, and a stopper 24 for holding the second lowermost article are disposed below the exhaustion detecting arm 21. The article dispensing plate 23 and the stopper 24 form a dispensing mechanism 5 which dispenses articles one at a time.

A base end portion of the article dispensing plate 23 is supported for swing motion on a shaft 26 fixed at positions corresponding to support portions 25 on the back surface of the fixed plate 6. A U-shaped swing frame 27 is supported for swing motion on the fixed shaft 26. A crank-shaped connecting rod 28 extended through a lower end portion of the swing frame 27 has one end connected to a plunger 29*a* included in a solenoid actuator 29 attached to the back surface of the fixed plate 6. When the solenoid of the solenoid actuator 29 is energized, the connecting rod 28 turns the swing frame 27 from a vertical position to a horizontal position. Indicated at 30 is a return spring.

A lower portion of a lifting member 31 is supported pivotally on the connecting rod 28 combined with the swing frame 27. A movable shaft 32 is extended through and supported on an upper end portion of the lifting member 31. The opposite end portions of the movable shaft 32 are fitted in vertical slots 34 formed in support walls 33 formed on the back surface of the fixed plate 6 by raising portions of the fixed plate 6 so as to move along the slots 34.

The movable shaft 32 can be brought into engagement with projections 35 projecting from the upper end of the article dispensing plate 23. A cam 36 is disposed near one side of the upper end of the article dispensing plate 23. When moved downward, the movable shaft 32 engages with the cam 36 to swing the article dispensing plate 23 to an article dispensing position.

The stopper 24 has lower support legs 37 pivotally supported on the fixed shaft 26, a cam slot 38 is formed in a portion extending upward of the support legs 37, and the movable shaft 32 is extended through the cam slot 38. When the movable shaft 32 is positioned at a lower position, the stopper 24 is retracted behind the front surface of the fixed plate 6 to release the second lowermost article. When the movable shaft 32 is positioned at an upper position, the stopper 24 is projected from the front surface of the fixed plate 6 to hold the second lowermost article.

A description will be given of the movable unit 15 disposed opposite to the fixed plate 6 so as to form the article dispensing passage 3 together with the fixed plate 6.

The movable unit 15 shown in FIGS. 3 to 15 is built in a construction capable of being installed in the rack 14 of the automatic vending machine 1 whenever necessary. The movable unit 15 is designed so as to be installed in an existing automatic vending machine.

In the first embodiment shown in FIGS. 3 to 15, a frame 40 has a shape resembling the letter U as viewed in a plane, a shock absorbing device 42 is disposed in an upper section of a space between side walls 41 of the frame 40, a first shiftable plate 43 of a small height is disposed below the shock absorbing device 42, and a second shiftable plate 44 of a height about twice as large as that of the shiftable plate 43 is disposed below the shiftable plate 43. The shiftable plate 43 will be called a first shiftable plate, and the shiftable plate 44 having a height greater than that of the first shiftable plate 43 will be called a second shiftable plate in the following description for convenience.

Figure 10:
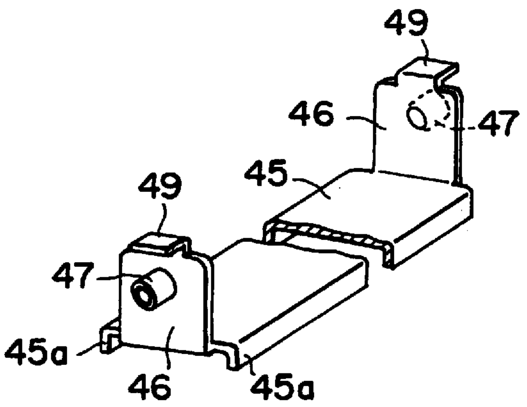
FIG. 10 is a partly cutaway perspective view of a shock absorbing member included in the article dispensing device of FIG. 3.

The shock absorbing device 42 has a shock absorbing plate 45 of a length as close to the distance between the opposite surfaces of the side walls 41 of the frame 40 possible. As shown in FIG. 10, the shock absorbing plate 45 is an elongate plate having support arms 46 formed by bending longitudinally opposite end portions thereof at right angles. Pivot pins 47 projecting from the outer surfaces of the support arms 46 are fitted slidably in horizontal guide slots 48 (FIG. 3) formed in the side walls 41 of the frame 40. End portions of the support arms 46 are bent outward to form stoppers 49. The stoppers 49 engage with the inner ends of the guide slots 48 to limit the advancement of the shock absorbing plate 45 toward the fixed plate 6 in order that the width of the dispensing passage may not be reduced below a predetermined width. The predetermined width is slightly greater than the radius of the article having the largest diameter among the articles to be vended by the automatic vending machine.

Longitudinal side portions 45*a* of the shock absorbing plate 45 are bent backward substantially at right angles, and ridges formed by bending the side portions 45*a* are rounded so that the circumference of the article may not be damaged or dented by a high impact exerted thereon when the falling article collides against the ridges of the shock absorbing plate 45.

Figure 14:
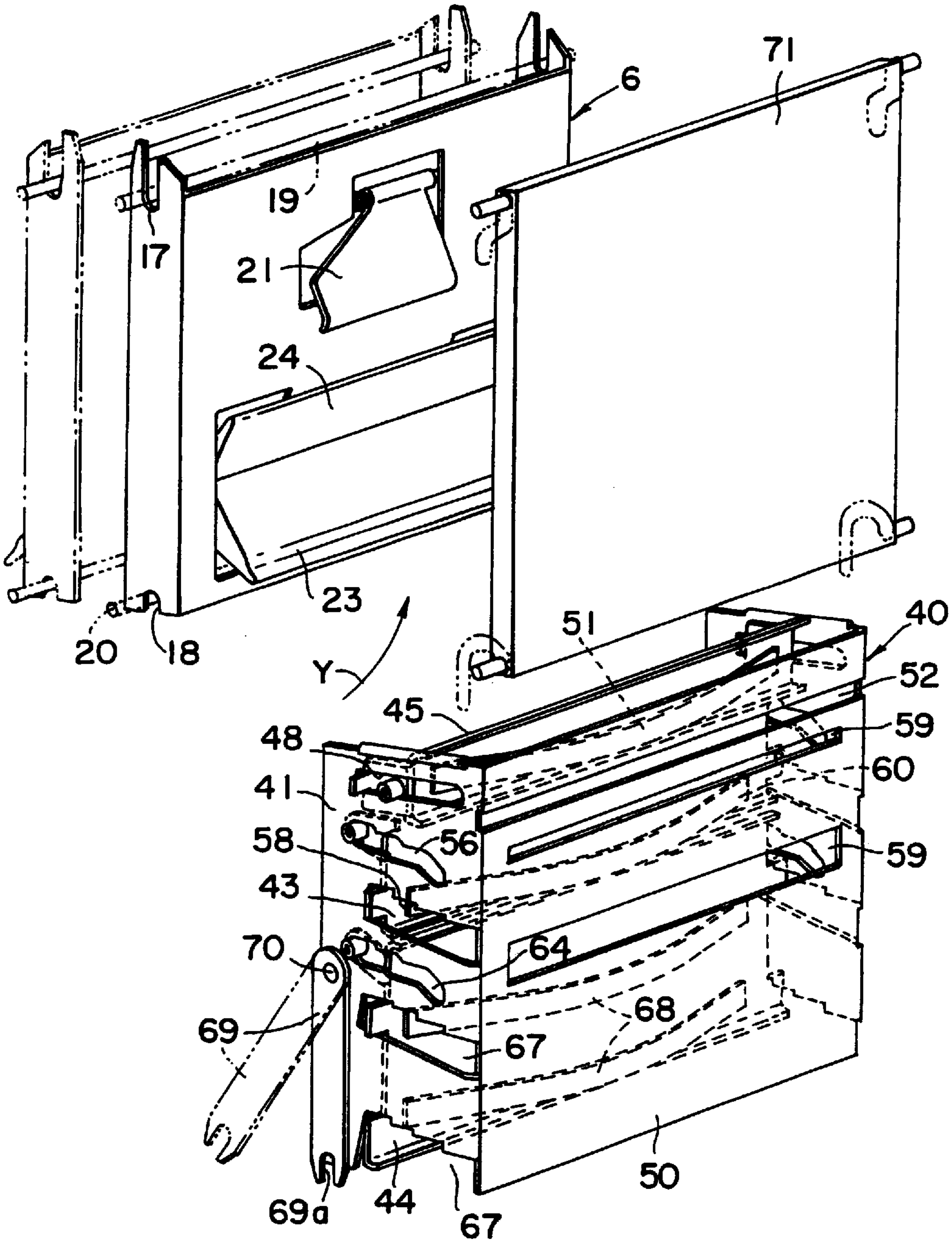
FIG. 14 is a perspective view of assistance in explaining processes of installing a movable unit in an automatic vending machine.

A middle portion of a curved plate spring 51 having the shape of a circular arc is fixed with a pin to a back wall 50 of the frame 40, and the opposite ends of the plate spring 51 are in contact with the back surface of the shock absorbing plate 45 as shown in FIG. 14. The plate spring 51 flexes resiliently to absorb shocks exerted on the shock absorbing plate 45. A slot 52 capable of receiving the lower bent portion 45*a* of the shock absorbing plate 45 is formed in the back wall 50 of the frame 40 to enable the shock absorbing plate 45 to make a sufficiently long backward stroke.

Figure 9:
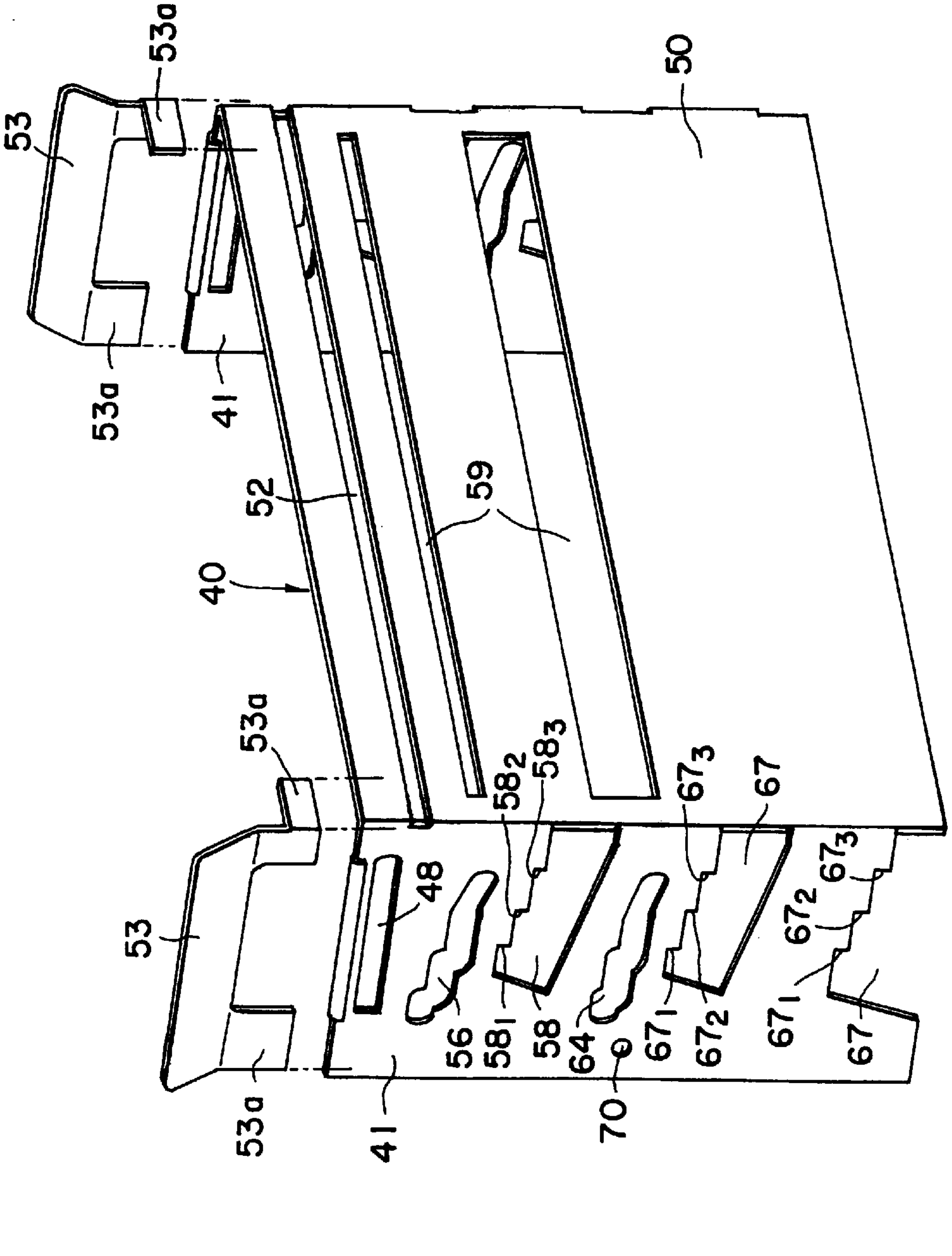
FIG. 9 is an exploded perspective view of a frame included in the movable unit included in the article dispensing device of FIG. 3.

Referring to FIG. 9, guide plates 53 having legs 53*a* formed by shaping thin spring plates are attached to the side walls 41 of the frame 40 by fixing the legs 53*a* to the upper end portions of the side walls 41 by spot welding or the like to prevent the article from being tilted by collision thereof against the upper ends of the side walls 41 when the article drops into a space between the side walls 41. The upper portions of the guide plates 53 are bent away from each other to form a downward tapered guide passage therebetween.

Figure 11:
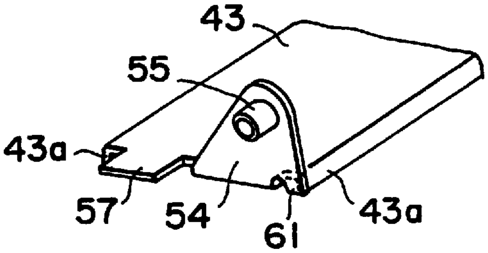
FIG. 11 is a perspective view of one end portion of a first shiftable plate included in the article dispensing device of FIG. 3.

The first shiftable plate 43 has a width equal to that of the shock absorbing plate 45. Opposite side portions of the first shiftable plate 43 are bent substantially through a right angle to form support arms 54 as shown in FIG. 11. Pivot pins 55 projecting from the outer surfaces of the support arms 54 are fitted in stepped slots 56 formed in the side walls 41 of the frame 40 so that the first shiftable plate 43 is able to turn on the pivot pins 55.

Each stepped slot 56 is inclined downward away from the dispensing passage 3. The stepped slots may be formed in a straight form in the side walls 41.

The first shiftable plate 43 has positioning lugs 57 projecting from the opposite sides of a lower end portion thereof. Each positioning lug 57 engages with one of steps $\mathbf{58_1}$, $\mathbf{58_2}$ and $\mathbf{58_3}$ of a stepped edge 58 of a positioning opening formed in the side wall 41. The differences between the adjacent ones of the steps $\mathbf{58_1}$, $\mathbf{58_2}$ and $\mathbf{58_3}$ are the same. When the positioning lugs 57 are in engagement with the step $\mathbf{58_1}$, $\mathbf{58_2}$ or $\mathbf{58_3}$, the first shiftable plate 43 is at a position a, b or c. The inclination of the stepped slots 56 corresponds to that of an inclined line along which the steps $\mathbf{58_1}$, $\mathbf{58_2}$ and $\mathbf{58_3}$ are arranged. The first shiftable plate 43 is positioned at a position d for the article having the largest diameter, where the first shiftable plate 43 is in close contact with the back wall 50 of the frame 40. When the first shiftable plate 43 is at the position d, the upper and the lower bent portions 43*a* of the first shiftable plate 43 are received in slots 59 formed in the back wall 50 of the frame 40.

A middle portion of a curved plate spring 60 having the shape of a circular arc is fixed with a pin to the back wall 50 of the frame 40, and the opposite ends of the plate spring 60 are in contact with the back surface of the first shiftable plate 43 as shown in FIG. 14. The first shiftable plate 43 can be moved to the position d against the resilience of the plate spring 60.

Projections 61 project upward from the base portions of the support arms 54 so as to project slightly from the line including the upper edge of the first shiftable plate 43. If the article strikes against the upper edge of the first shiftable plate 43 and tries to turn the first shiftable plate 43 excessively clockwise, as viewed in FIG. 3, the projections 61 come into contact with the back wall 50 to limit the clockwise turning of the first shiftable plate 43 so that the first shiftable plate 43 can be quickly set in a vertical position for actions to determine the width of the dispensing passage. Another pivot pin may be formed beside each of the pivot pins 55 so as to come into contact with the lower edge of the stepped slot 56 to limit the clockwise turning of the first shiftable plate 43 instead of limiting the clockwise turning of the first shiftable plate 43 by the projections 61. The second shiftable plate 44 disposed below the first shiftable plate 43 is the same in structure as the first shiftable plate 43, except that height of the second shiftable plate 44 is about twice that of the first shiftable plate 43. The second shiftable plate 44 is formed in such a big height in order that the dispensing passage 3 is formed in a sufficiently big length to ensure a successful dispensing operation.

Figure 12:
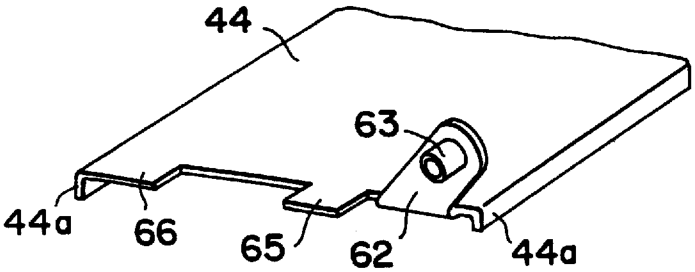
FIG. 12 is a perspective view of one end portion of a second shiftable plate included in the article dispensing device of FIG. 3.
Figure 13:
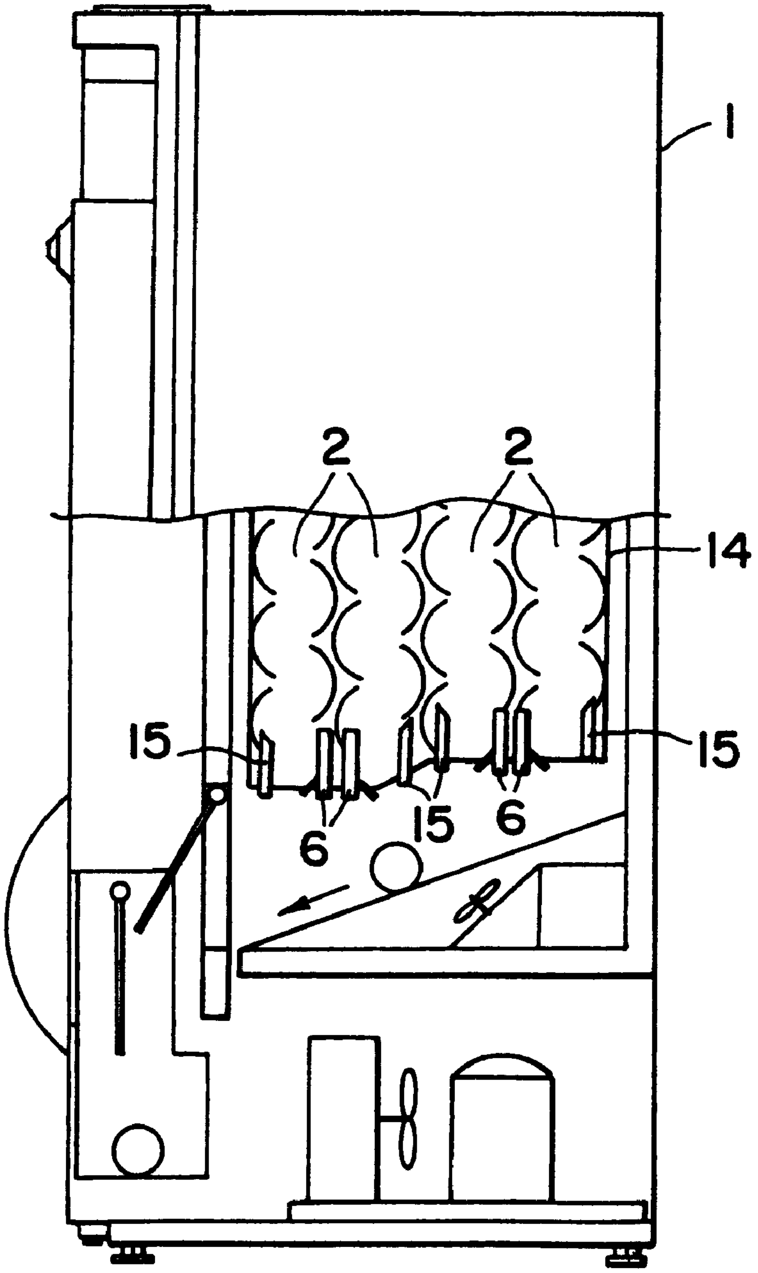
FIG. 13 is a partly cutaway side view of an automatic vending machine, illustrating the disposition of a movable unit in accordance with the present invention.

As shown in a fragmentary perspective view in FIG. 12, opposite side portions of the second shiftable plate 44 are bent substantially through a right angle to form support arms 62 extending obliquely upward. Pivot pins 63 projecting from the outer surfaces of the support arms 62 are fitted in stepped slots 64 formed in the side walls 41 of the frame 40 so that the second shiftable plate 44 is able to turn on the pivot pins 55. The stepped slots 64 are similar in shape to the stepped slots 56.

The second shiftable plate 44 has positioning lugs 65 and 66 projecting from the side edges thereof. The positioning lugs 65 are at positions near the support arms 62, and the positioning lugs 66 are formed in a lower end portion of the second shiftable plate 44. The positioning lug 65 and 66 engage with steps $\mathbf{67_1}$, $\mathbf{67_2}$ or $\mathbf{67_3}$ of stepped edges 67 of positioning openings formed in the side wall 41. The second shiftable plate 44 is in close contact with the back wall 50 of the frame 40 for the article having the largest diameter with the upper bent portion 44*a* thereof received in the slots 59 formed in the back wall 50 of the frame 40. In this state, the lower bent portion 44*a* of the second shiftable plate 44 lies below the lower edge of the back wall 50. Thus, the second shiftable plate 44, similarly to the first shiftable plate 43, is able to be positioned at a position a, b, c or d.

A middle portion of a curved plate spring 68 having the shape of a circular arc is fixed with a pin to the back wall 50 of the frame 40, and the opposite ends of the plate spring 68 are in contact with the back surface of the second shiftable plate 44 as shown in FIG. 14. The second shiftable plate 44 can be moved between the positions a and d against the resilience of the plate spring 68.

Incidentally, the positions a, b, c and d correspond to the outside diameters of 47 mm (article $A_1$), 53 mm (article $A_2$), 60 mm (article $A_3$) and 66 mm (article $A_4$), respectively, of currently used cans containing beverages.

The least working width of the movable unit 15, i.e., the distance between the front surface of the first shiftable plate 43 or the second shiftable plate 44 and the back surface of the back wall 50 of the frame 40 in a state where the first shiftable plate 43, the second shiftable plate 44 and the shock absorbing plate 45 are retracted to their backmost positions is equal to the sum of the thickness of the first shiftable plate 43 (the second shiftable plate 44, the shock absorbing plate 45), the thickness of the back wall 50 of the frame 40 and the thickness of the plate spring 51 (60, 68), which is several millimeters smaller than the thickness of a marginal space in the dispensing passage 3 of the automatic vending machine.

Although the article dispensing device in the first embodiment is provided with the first shiftable plate 43 and the second shiftable plate 44, the article dispensing device may be provided with only the second shiftable plate 44, and it is most preferable to dispose the shock absorbing device 42 above the second shiftable plate 44 to absorb shocks exerted by the dropping article and to surely secure the dispensing passage of a necessary width by the combination of the shock absorbing device 42 and the second shiftable plate 44. It is desirable to use the first shiftable plate 43 in addition to the second shiftable plate 44 when shocks exerted by the falling article cannot be absorbed only by the shock absorbing device 42.

Figure 15:
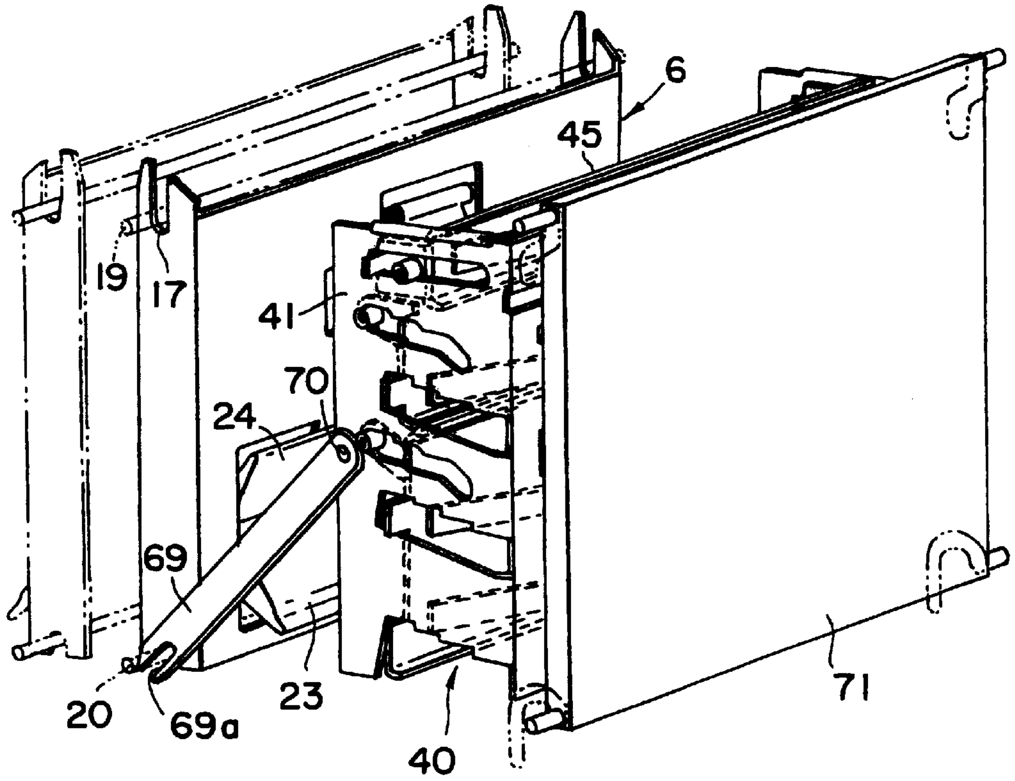
FIG. 15 is a perspective view of the movable unit installed in the automatic vending machine.

Base end portions of support arms 69 provided in their free end portions with recesses 69*a* are pivotally supported on the outer surface of the side walls 41 of the frame 40 at positions on the side of the fixed plate 6 in middle portions of the side walls 41 of the frame with pins 70 as shown in FIG. 14. The movable unit 15 is installed in the automatic vending machine so that the opposite end portions of the shaft 20 holding the lower portions of the fixed plate 6 are received in the recesses 69*a* of the support arms 69. As shown in FIG. 14, the movable unit 15 is inserted from below into a space between the fixed plate 6 and a passage plate 71 disposed in the dispensing passage 3 of the automatic vending machine as indicated by the arrow Y, and the support arms 69 are engaged with the shaft 20 so as to receive the opposite end portions of the shaft 20 in the recesses 69*a* to support the frame 40 of the movable unit 15 in place as shown in FIG. 15. Thus, pressure acting downward on the frame 40 when the article is dispensed presses the back wall 50 of the frame 40 against the passage plate 71. Therefore, the greater the pressure acting on the frame 40, the greater is the pressure for firmly holding the frame 40 in place.

The frame 40 in this embodiment is a plate having a U-shaped cross section. However, the back wall 50 is not necessarily indispensable if a plurality of rods are extended between and fixed by staking or the like to the side walls 41. Side plates included in the automatic vending machine may be used as the side walls 41.

The operation of the article dispensing device in this embodiment will be described hereinafter.

The shock absorbing plate 45 of the shock absorbing device 42 of the movable unit 15 disposed in the dispensing passage 3 is advanced to its front limit position by the resilience of the plate spring 51, the first shiftable plate 43 and the second shiftable plate 44 are held at their front limit positions by the resiliences of the plate springs 60 and 68, respectively, with the pivot pins 55 and 63 at the left end positions, as viewed in FIG. 3, of the stepped slots 56 and 64, the first shiftable plate 43 and the second shiftable plate 44 inclined so that the lower end portions thereof extend into the dispensing passage 3, and the positioning lugs 57, 65 and 66 not in engagement with any steps of the stepped edges 58 and 67.

When the articles A are stacked in the rack 14 of the automatic vending machine, the lowermost article A drops onto the upper end of the shock absorbing plate 45, pushes the shock absorbing plate 45 out of the way and drops down. When the article A pushes the shock absorbing plate 45 out of the way against the resilience of the plate spring 51, the dropping speed of the article A is reduced, so that the article A move stably downward.

Figure 7:
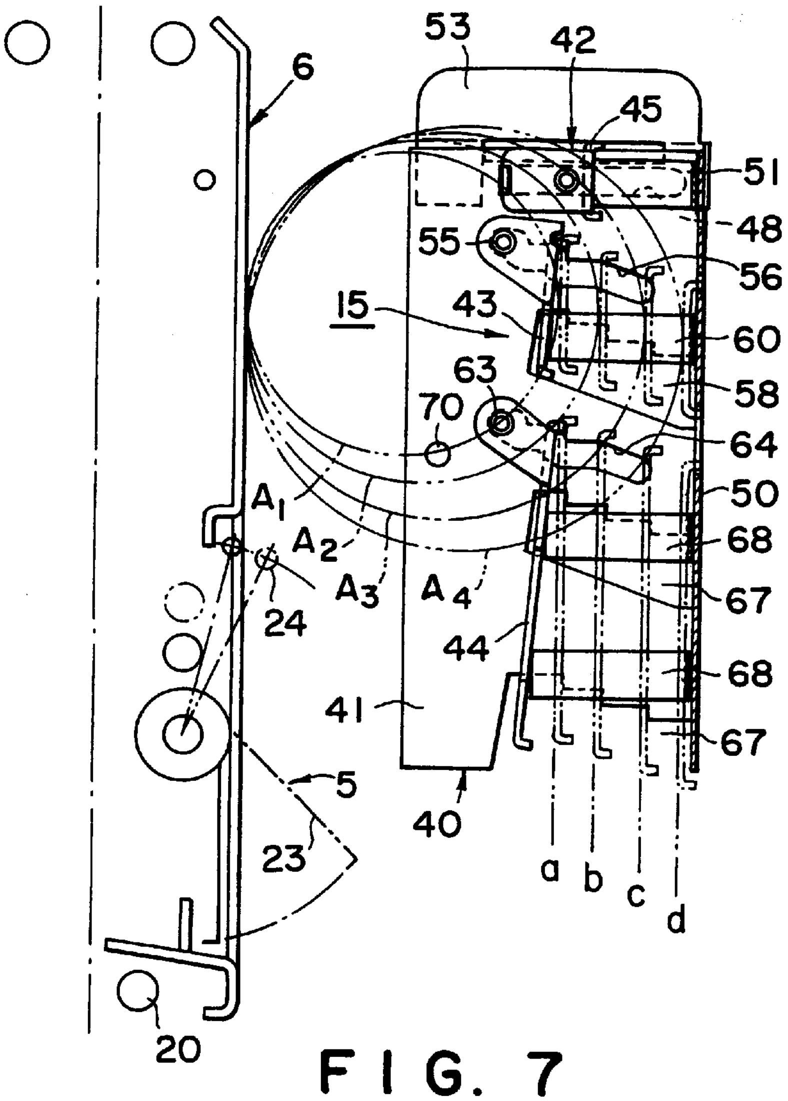
FIG. 7 is a view of assistance in explaining operations of the article dispensing device of FIG. 3.

During downward movement through a region corresponding to the first shiftable plate 43, the article A shoves the first shiftable plate 43 to the right, as viewed in FIG. 3 or 7, to a position conforming to the outside diameter of the article A. If the article A is the article $A_1$ having the smallest diameter, the pivot pins 55 of the first shiftable plate 43 move slightly to the right on the uppermost steps of the stepped slots 56, the first shiftable plate 43 turns on the pivot pins 55 into a vertical position, the positioning lugs 57 come into engagement with the foremost steps 58$_1$ of the positioning edges 58 to inhibit the further turning of the first shiftable plate 43. Thus, the first shiftable plate 43 is held fixedly at the position a. While the articles $A_1$ are dispensed, the first shiftable plate 43 is held at the position a to serve as one of the walls defining the dispensing passage 3. The articles $A_2$, $A_3$ and $A_4$ shove the first shiftable plate 43 to the positions b, c and d, respectively.

During the downward movement of the lowermost article A through a region corresponding to the second shiftable plate 44, if the article A is the article $A_1$, the positioning lugs 65 and 66 of the second shiftable plate 44 come into engagement with the steps 67$_1$ of the positioning edges 67 corresponding to the outside diameter of the article $A_1$ to hold the second shiftable plate 44 fixedly at the position a so that the front surface of the second shiftable plate 44 is flush with that of the first shiftable plate 43. Subsequently, the article A is stopped by the article dispensing plate 23 supported on the fixed plate 6 and kept on the article dispensing plate 23 until a dispensing command is given.

The article A is dispensed by an article dispensing operation which is the same as the conventional article dispensing operation. When a sale button placed on the front door 13 of the automatic vending machine 1 is depressed, the solenoid of the solenoid actuator 29 held on the fixed plate 6 is energized to pull the plunger 29*a* against the resilience of the return spring 30, whereby the swing frame 27 is turned through the connecting rod 28 toward a position where the swing frame 27 is set in a horizontal position, and the lifting member 31 is moved upward to lift up the movable shaft 32. Consequently, the article dispensing plate 23 is released, the article dispensing plate 23 is turned by the weight of the article A on the shaft 26 so as to sink beneath the surface of the fixed plate 6 to dispense the article A.

At the same time, the raised movable shaft 32 extended through the cam slot 38 of the stopper 24 turns the stopper

24 so as to project from the surface of the fixed plate 6 and holds the stopper 24 at an article holding position. Consequently, the second lowermost article A is kept on the stopper 24.

The solenoid of the solenoid actuator 29 is de-energized after the article A has been dispensed. Then, the plunger 29*a* is returned to its initial position by the return spring 30, the swing frame 27 swings to a position where the swing frame is set in a vertical position, the lifting member 31 is lowered to lower the movable shaft 32, and the movable shaft 32 pushes the cam 36 of the article dispensing plate 23 as the same is moved downward and engages with the base potion of the article dispensing plate 23 to lock the article dispensing plate 23 in a position projecting from the surface of the fixed plate 6.

The stopper 24 is released when the movable shaft 32 is lowered, and the next article A is allowed to drop onto and kept on the article dispensing plate 23.

If a wrong article A of a diameter greater than that of the normal articles A mingled accidentally with the normal articles A, the wrong article A pushes the shock absorbing plate 45 further out of the way, hits against the upper end of the first shiftable plate 43 and turns the first shiftable plate 43 clockwise, as viewed in FIG. 3. Consequently, the positioning lugs 57 are disengaged from the steps 58$_1$ of the positioning edges 58, are moved to the right, as viewed in FIG. 3, and the positioning lugs 57 engage with the steps conforming the outside diameter of the wrong article A. The wrong article A shifts the second shiftable plate 44 in the same manner, and is dispensed when a dispensing command is given to the automatic vending machine. Such a problem can be solved simply by taking the dispensed wrong article to the shop responsible to the management of the automatic vending machine to ask the shop to exchange the wrong article for an article the consumer wanted to buy. However, if such a problem arises in the conventional automatic vending machine, the automatic vending machine will be clogged with the wrong article, and a maintenance technician must be called to restore the automatic vending machine to its normal condition.

In the movable unit 15 of this embodiment, the shock absorbing device 42, the first shiftable plate 43 and the second shiftable plate 44 are arranged in that order. However, the shock absorbing device 42 may be omitted and two shiftable plates similar to the first shiftable plate 43 may be employed, three shiftable plates similar to the first shiftable plate 43 may be employed or the first shiftable plate 43 and the second shiftable plate 44 may be replaced with each other.

In all cases, the dispensing passage 3 of a width conforming to the diameter of the articles A is secured as long as the dispensing passage 3 is packed with the articles A, the shiftable plates are advanced to the front limit positions when the dispensing passage 3 is empty, and the shiftable plates are shifted to form the dispensing passage 3 in a width conforming to the outside diameter of articles supplied into the dispensing passage 3.

If a wrong article of a diameter greater than that of normal articles mingled with the normal articles, the dispensing operation of the automatic vending machine may be interrupted. If it is desired to stop the dispensing operation of the automatic vending machine in such a case, the movable unit 15 is shifted upward, and the positional relation between the upper end of the second shiftable plate 44 and the exhaustion detecting arm 21 supported on the fixed plate 6 is adjusted.

Figures 16A, 16B, 16C, 16D:
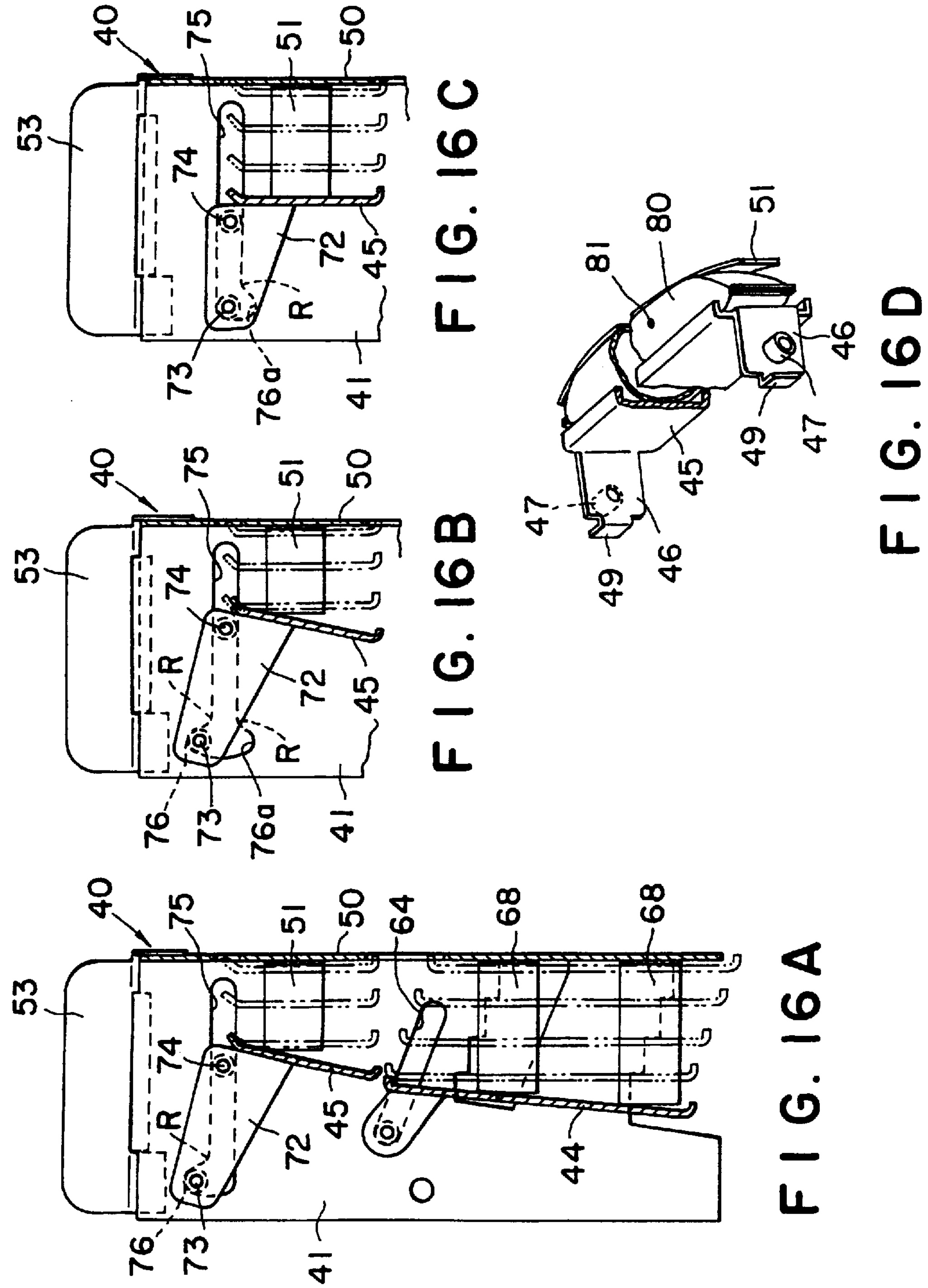
FIGS. 16A to 16D are views of assistance in explaining other shock absorbing members.

FIGS. 16A to 16C show shock absorbing devices in modifications of the shock absorbing device 42 shown in FIG. 3. In these shock absorbing devices, side walls 72 are disposed at end portions of the shock absorbing plate 45, and shafts 73 and 74 are provided on the side walls 72 so that the shafts 73 and 74 are spaced in a forward-backward direction. The shafts 73 and 74 are extended through guide slots 75 formed in the side walls 41 of the frame 40, and a recess 76 capable of receiving the shaft 73 is formed in one end of the guide slot 75 on the side of the fixed plate 6. A corner R in the edge of the guide slot 75 between the recess 76 and a straight section of the guide slot 75 is rounded to enable the shaft 73 to slide out of the recess 76.

In the shock absorbing device shown in FIG. 16A, the recess 76 is formed so as to protrude upward from each guide slot 75. The shaft 73 is kept always in the recess 76 by the resilience of a spring 51. When an article A hits against a shock absorbing plate 45, the shock absorbing plate 45 is turned counterclockwise on the shaft 74, the shaft 73 is moved gradually out of the recesses 76, and then the shock absorbing plate 45 is moved slowly backward along the guide slots 75 to absorb shocks exerted by the article A thereon. Thus, the shock absorbing device exercises an enhanced shock absorbing effect.

In the shock absorbing device shown in FIG. 16B, an upper recess 76 and a lower recess 76*a* are formed in so as to protrude upward and downward, respectively, from each guide slot 75 to make the shaft 73 move between the upper recess 76 and the lower recess 76*a* in order that the backward movement of the shaft 73 is retarded and the shock absorbing plate 45 starts sliding backward with a delay for the further enhanced shock absorbing effect. In the shock absorbing device shown in FIG. 16C, only a lower recess 76*a* is formed to make the shaft 73 enter the lower recess 76*a* first, and then the shaft 73 moves out of the lower recess 76*a*, which is effective in absorbing shocks.

FIG. 16D shows a shock absorbing device 42 in a further modification. An elongate bag 80 made of a highly elastic, resilient material, such as polypropylene, an elastomer raw rubber or the like, and provided with a vent 81 is interposed between and bonded to a shock absorbing plate 45 and a plate spring 51. When shocks are exerted on the shock absorbing plate 45 by an article A, the bag 80 is compressed and becomes flat gradually discharging air through the vent 81 to absorb the shocks. After the article A has passed the shock absorbing plate 45, the bag 80 sucks air in through the vent 81 and expands. Thus, the bag 80 impedes the accelerated downward movement of the article A perfectly, and this shock absorbing device does not need any thickness for the bending of the plate spring 51.

Figure 8:
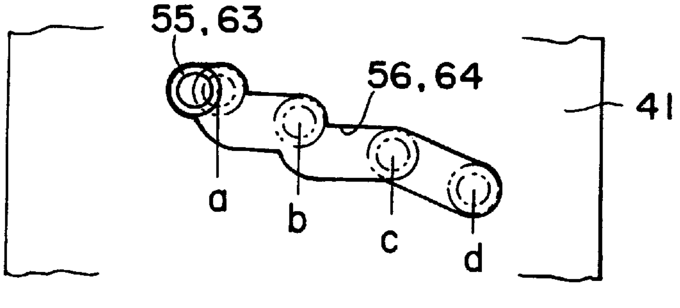
FIG. 8 is a view of assistance in explaining the shape of a support slot shown in FIGS. 3 and 7.

The recesses 76 and 76*a* may be formed, in addition to those formed at the end of each guide slot 75, in each guide slot 75 at positions corresponding to the positions a to d shown in FIG. 8 to exert resistance against the backward movement of the shaft 73 until the shaft 73 reaches a position corresponding to one of the positions a to d.

Figure 17:
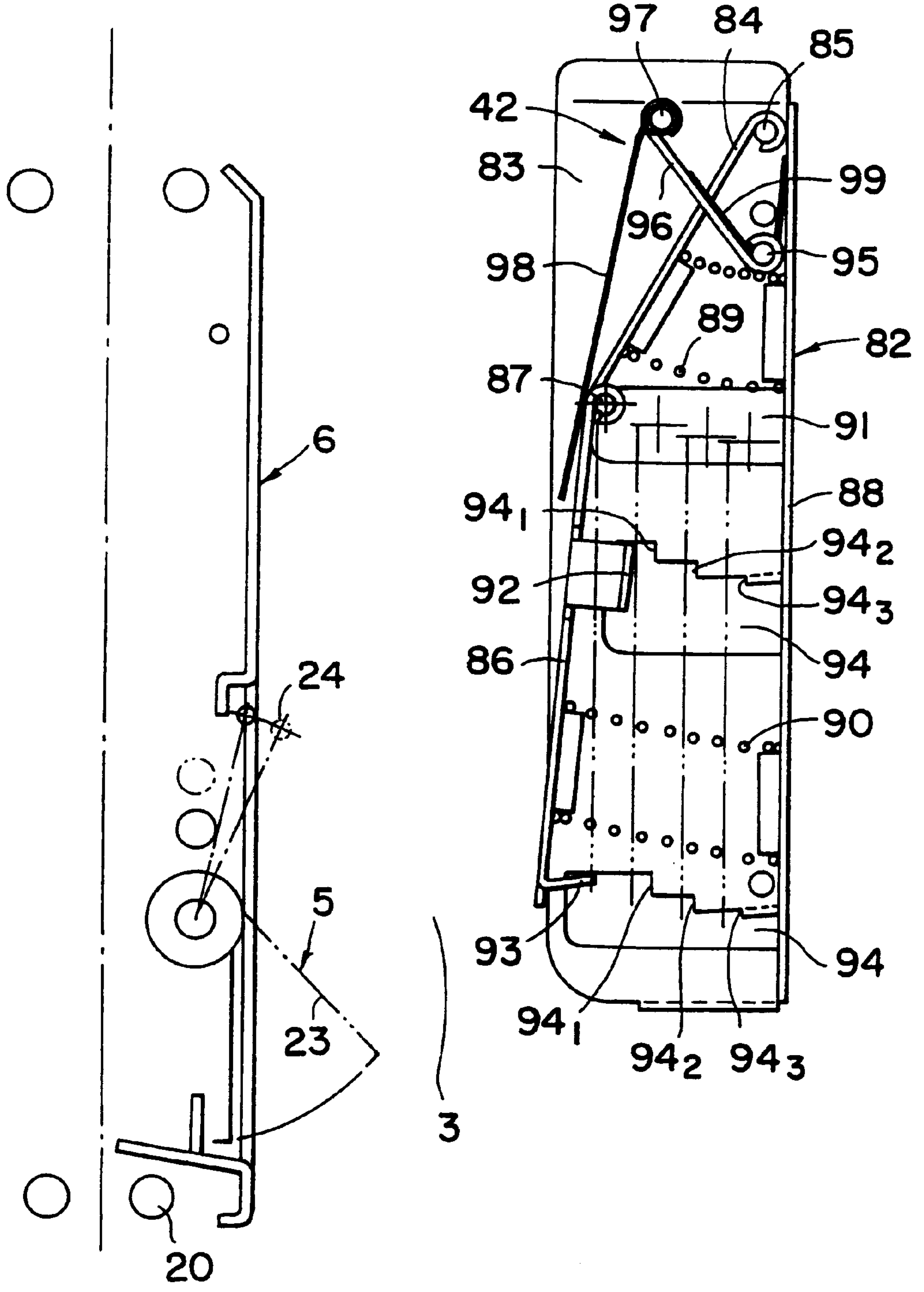
FIG. 17 is a sectional view of an article dispensing device in a second embodiment according to the present invention.

Referring to FIG. 17 showing an article dispensing device in a second embodiment according to the present invention employed in an automatic vending machine, an inclined plate 84 is disposed between side walls 83 of a frame 82 and is supported for swing motion at its upper end by a shaft 85 on the side walls 83 of the frame 82, the upper end of a shiftable plate 86 is connected to the lower end of the inclined plate 84 by a shaft 87, the inclined plate 84 is biased toward a fixed plate 6 by a spring 89 interposed between a back wall 88 of the frame 82 and the inclined plate 84, and the shiftable plate 86 is biased toward the fixed plate 6 by a spring 90 interposed between the back wall 88 of the frame 82 and the shiftable plate 86.

The opposite ends of the shaft 87 supporting the shiftable plate 86 at its upper end are fitted in horizontal slots 91 formed in the side walls 83 of the frame 82. Positioning lugs 92 and 93 project from the opposite side edges of an upper and a lower portion of the shiftable plate 86, respectively. Each of the positioning lugs 92 and 93 are engaged with one of steps $94_1$ to $94_3$ of a corresponding one of positioning edges 94 formed in the side walls 83 of the frame 82.

A shock absorbing device 42 comprises a support plate 96 supported for swing motion at its lower end by a shaft 95 disposed below the shaft 85 pivotally supporting the inclined plate 84 between the side walls 83 of the frame 82 so as to extend obliquely upward from the shaft 95, and a shock absorbing plate 98 connected to the upper end of the support plate 96 by a shaft 97 or hooked on the upper end of the support plate 96. A lower portion of the shock absorbing plate 98 extends downward beyond the upper end of the shiftable plate 86 to a position somewhat below the shaft 87. The position of the upper end of the shock absorbing plate 98 is slightly nearer to the back wall 88 of the frame 82 than the position of the center of an article having the largest diameter of those of articles which can be vended by the automatic vending machine. The support plate 96 is biased by a spring 99.

When one of articles A stored in a rack 14 enters a dispensing passage 3, the article A hits against the upper end of the shock absorbing plate 98, and pushes the shock absorbing plate 98 out of the way according to its diameter as it moves downward. Consequently, the shaft 87 supporting the shiftable plate 86 at its upper end is forced to move toward the back wall 88 of the frame 82 against the resilience of the springs 89 and 90, each of the positioning lugs 92 and 93 engages one of the steps $94_1$ to $94_3$ corresponding to the position of the shaft 87 or comes into contact with the back wall 88, and the shiftable plate 86 defines a dispensing passage 3 together with the fixed plate 6.

While the dispensing passage 3 is empty, the shiftable plate 86 is kept in an inclined position as indicated by continuous lines in FIG. 17 by the resilience of the springs 89 and 90, the positioning lugs 92 and 93 are disengaged from the steps of the positioning edges 94, and the shaft 87 supporting the shiftable plate 86 at its upper end returns to its initial position corresponding to the front ends of the slots 91.

A control system for controlling the article dispensing device will be explained by way of example with reference to flow charts shown in FIG. 18.

Figure 18:
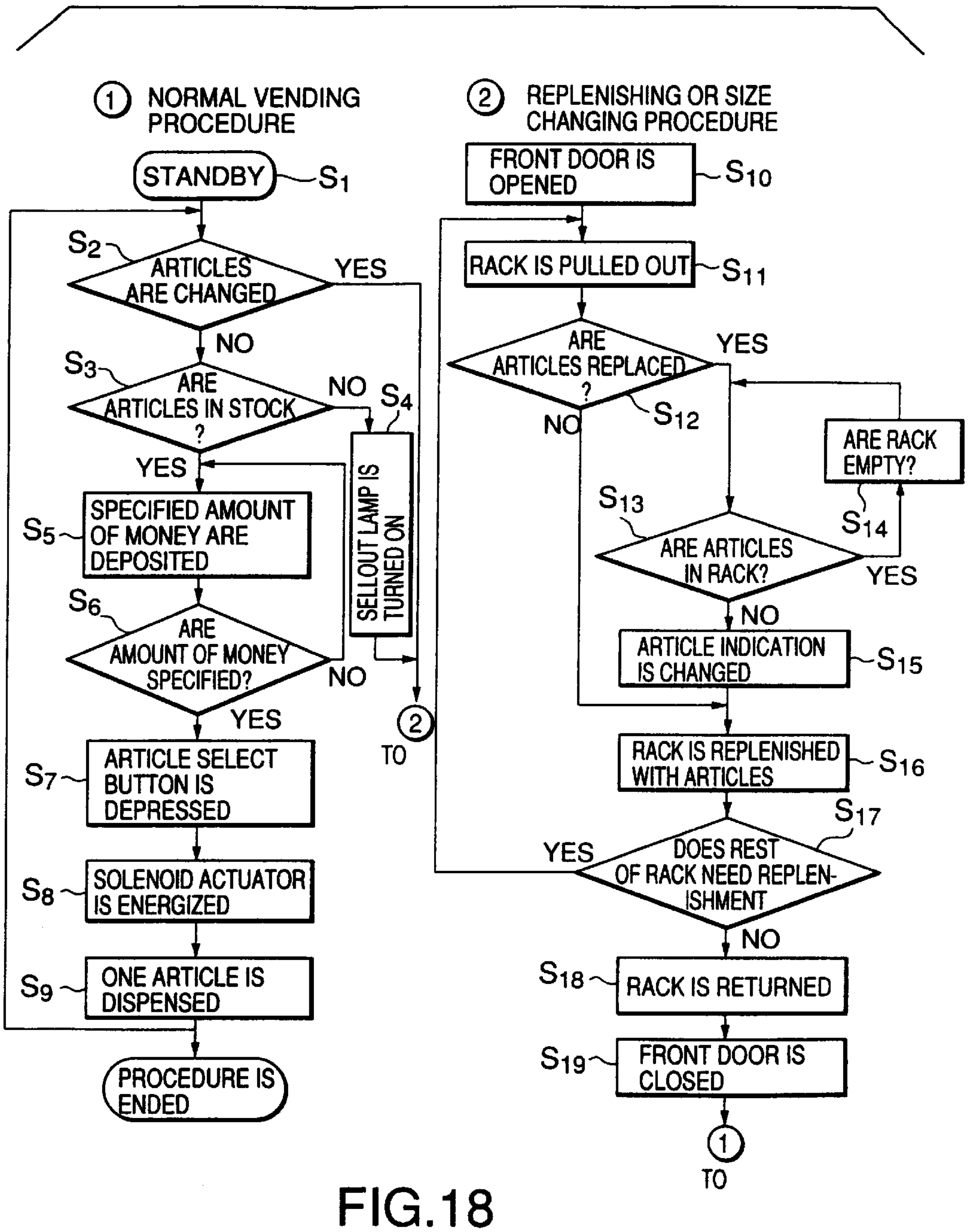
FIG. 18 is a flow chart showing operations.
Figure 19:
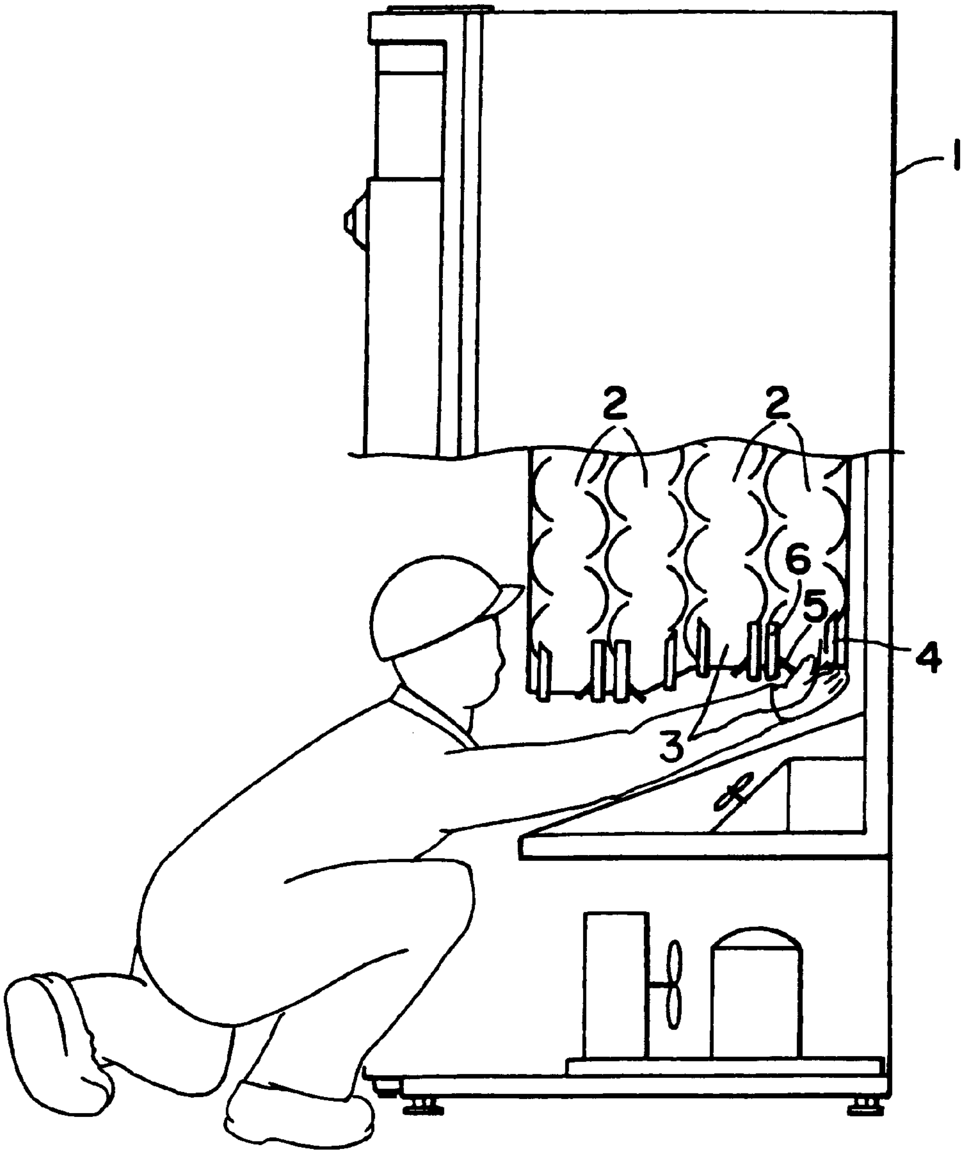
FIG. 19 is a side view of assistance in explaining difficulty in adjusting the width of a conventional dispensing passage.
Figure 20:
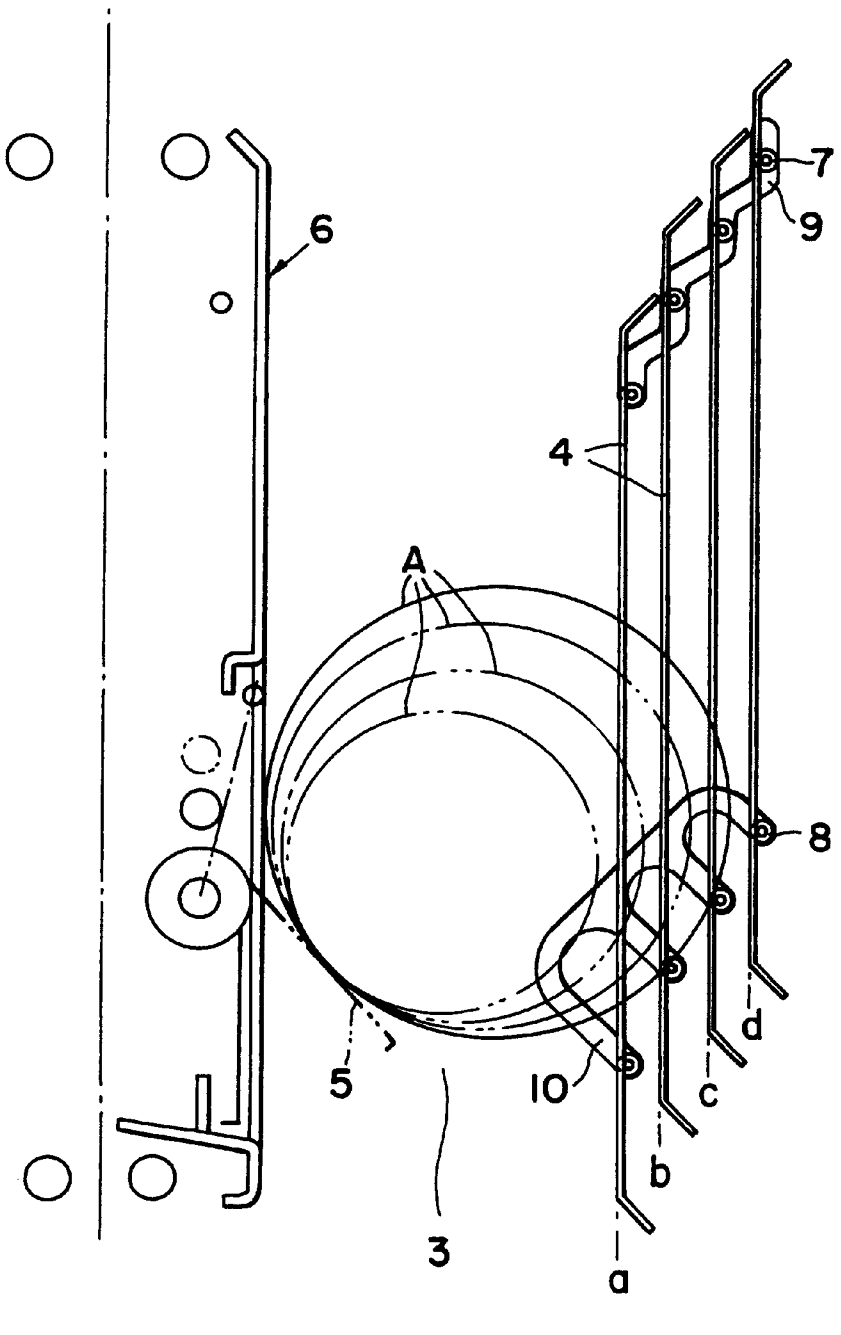
FIG. 20 is a schematic sectional view of a conventional passage width adjusting mechanism.
Figure 21:
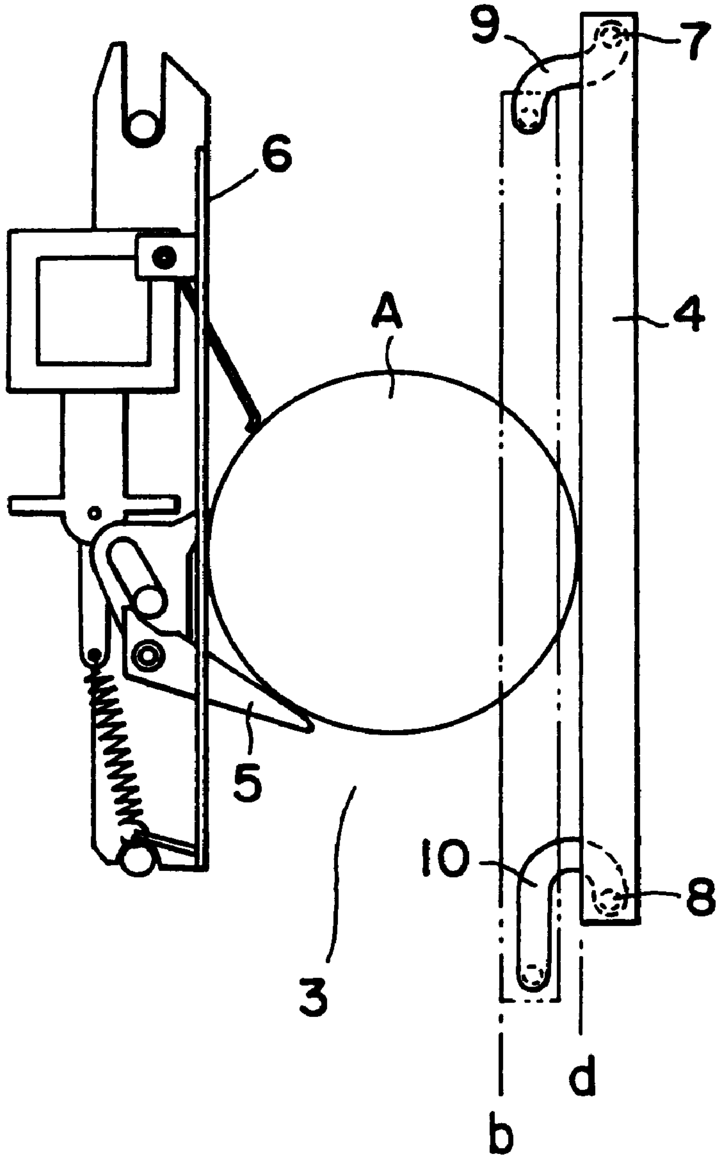
FIG. 21 is a schematic sectional view of a conventional passage width adjusting mechanism.
Figure 22B:
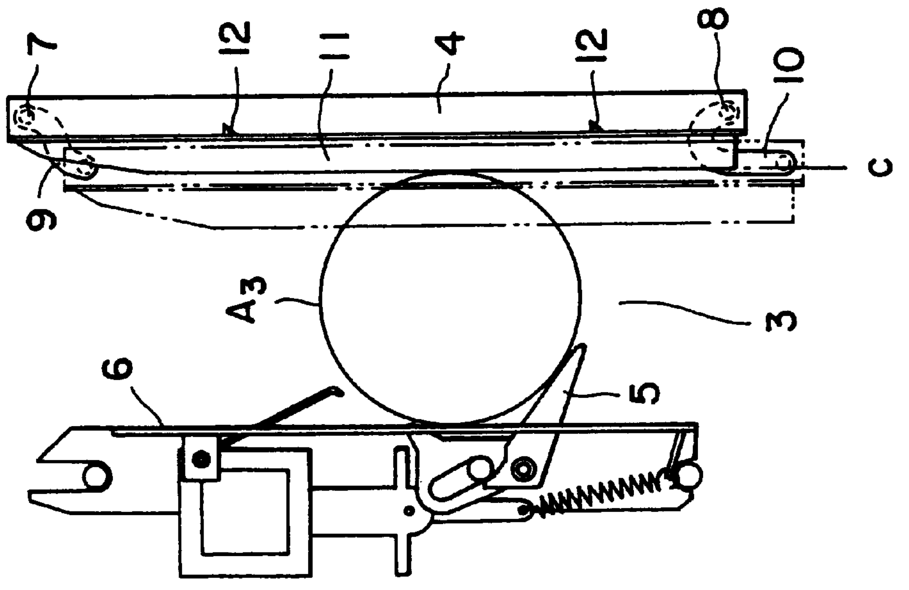
FIGS. 22A and 22B are views of assistance in explaining an intermediate width adjusting means included in the passage width adjusting mechanism of FIG. 20.
Figure 22A:
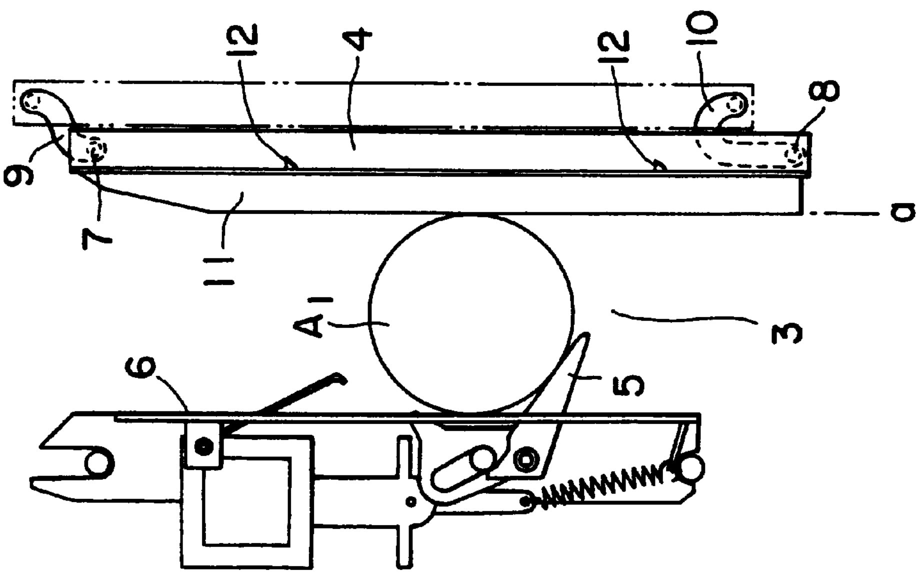

In FIG. 18, a flow chart ① shows a normal vending procedure and a flow chart ② shows a replenishing or size changing procedure.

Referring to the flow chart ①, the article vending device is on standby in step $S_1$. A query is made in step $S_2$ to see if the articles need to be changed. If the response in step $S_2$ is negative, a query is made in step $S_3$ to see if articles are in stock. If the response in step $S_2$ is affirmative, the procedure shown in the flow chart ② is started. If the response in step $S_3$ is negative, a sellout lamp is turned on in step $S_4$.

If articles are in stock, coins equivalent to a specified amount of money are deposited in step $S_5$. A query is made in step $S_6$ to see if the amount of money deposited in the automatic vending machine coincides with the specified amount of money. If the response in step $S_6$ is affirmative, an article select button is depressed in step $S_7$, the solenoid of the solenoid actuator 29 is energized in step $S_8$, one article is dispensed in step $S_9$ and the procedure is ended. If any article is not dispensed, the procedure returns to step $S_2$.

Referring to the flow chart ②, the front door 13 is opened in step $S_{10}$, the rack 14 is pulled out in step $S_{11}$, and a query is made in step $S_{12}$ to see if the articles are to be replaced with other articles. If the response in step $S_{12}$ is affirmative, the interior of the rack 14 is inspected in step $S_{13}$ to see if there are any articles in the rack. If there are stock articles in the rack 14, the stock articles are removed from the rack 14 to empty the latter in step $S_{14}$. If there is no stock article, an article indication is changed in step $S_{15}$.

The rack 14 is replenished with articles in step $S_{16}$ and a query is made in step $S_{17}$ to see if the rest of the rack 14 need replenishment. If the response in step $S_{17}$ is affirmative, the procedure returns to step $S_{11}$. If the response in step $S_{17}$ is negative, the rack 14 is returned into the automatic vending machine in step $S_{18}$, the front door 13 is closed in step $S_{19}$ and the procedure jumps to the procedure of the flow chart ①.

In the procedure of the flow chart ②, step $S_{11}$ for pulling out the rack 14 and step $S_{18}$ for returning the rack 14 into the automatic vending machine are not always necessary.

As is apparent from the foregoing description, according to the present invention, the dispensing passage through which cylindrical articles, cans or bottles containing beverages, are dispensed one at a time is defined by the fixed plate and the movable unit, and the width of the dispensing passage changed automatically by the article moving through the dispensing passage according to the diameter of the same article. Therefore any manual work for adjusting the width of the dispensing passage necessary when the articles are replaced with other articles are not necessary at all, which facilitates the management of the automatic vending machine.

Since the shiftable plate of the movable unit is shifted to a position conforming to the outside diameter of the article passing through the dispensing passage to adjust the width of the dispensing passage to a width conforming to the outside diameter of the article, even a wrong article having a diameter different from the normal articles and mingled with the normal articles can be dispensed without clogging the dispensing passage. Therefore, trouble to call a maintenance technician to repair the automatic vending machine can be saved, service personnel need not be dispatched, a procedure for the redress of grievance of the shop is simplified, downtime during which the automatic vending machine is not operating due to repair work can be reduced, troubles to make purchasers unpleasant and to spoil purchasers image of the enterprise can be reduced, and the breakdown of the automatic vending machine can be prevented. Thus, the present invention provides a great economic effect.

Furthermore, since the article dispensing device does not need any electrical means at all, the same can be easily installed not only in automatic vending machines of a new type but also in automatic vending machines of an old type, and the movable unit is capable of functioning with high reliability.

We claim:

1. An article dispensing device for an automatic vending machine having a body and capable of storing articles having a cylindrical or substantially cylindrical shape resembling bottles or cans in stacks, and of dispensing the article in response to a dispensation command, said article dispensing device comprising;

a fixed plate serving as a wall defining an article dispensing passage, and holding a dispensing mechanism for dispensing the articles one at a time; and a movable unit disposed opposite to the fixed plate;

wherein the movable unit comprises: a frame attached to the body of the automatic vending machine; shiftable plate means supported on side walls of the frame by pivot pins fitted in slots formed respectively in the side walls, and provided with positioning lugs projecting from at least one end thereof so as to engage with steps of stepped positioning edges formed in the side walls selectively according to a diameter of the article passing through the dispensing passage; and a biasing means for biasing the shiftable plate means so that a lower end portion of the shiftable plate means protrudes into the dispensing passage.

2. The article dispensing device for an automatic vending machine according to claim 1, wherein the slots formed in the side walls of the frame extend along the width of the side walls.

3. The article dispensing device for an automatic vending machine according to claim 1, wherein the slots formed in the side walls of the frame are inclined downward away from the fixed plate.

4. The article dispensing device for an automatic vending machine according to claim 1, wherein a shock absorbing means for absorbing shocks that may be exerted by an accelerated dropping article and for guiding the article toward the fixed plate is disposed in an upper portion of the frame.

5. The article dispensing device for an automatic vending machine according to claim 4, wherein the shock absorbing means includes a shock absorbing member capable of moving back when the circumference of the article comes into contact with the shock absorbing member, provided with pivot pins at its opposite ends, supported on the opposite side walls of the frame by slidably fitting the pivot pins in guide slots formed in the opposite side walls, and a spring resiliently biasing the shock absorbing member toward the fixed plate.

6. The article dispensing device for an automatic vending machine according to claim 5, wherein the frame of the movable unit has a recess capable of receiving a pivot pin of the shock absorbing means formed in an upper portion or a lower portion of one end of each guide slot on the side of the fixed plate, or recesses capable of receiving a pivot pin of the shock absorbing means formed in upper and lower portions of one end of each guide slot on the side of the fixed plate.

7. The article dispensing device for an automatic vending machine according to claim 5, wherein a pneumatic shock absorbing bag for attenuating the acceleration of the dropping article so that only the weight of the article acts on the shock absorbing member is interposed between the shock absorbing member and the spring biasing the shock absorbing member.

8. The article dispensing device for an automatic vending machine according to claim 4, wherein the shock absorbing means comprises: a support plate extended between and pivotally supported on upper portions of the opposite side walls of the frame so as to extend obliquely upward toward the fixed plate; and a shock absorbing plate supported by a shaft on the free end of the support plate;

wherein an inclined plate is extended between and pivotally supported on upper portions of the side walls of the frame, an upper end portion of the shiftable plate is connected by a connecting shaft to a lower end portion of the inclined plate, the opposite ends of the connecting shaft are fitted for movement in support slots formed in the side walls, and the shock absorbing plate is disposed so that its back surface is in contact with the circumference of the connecting shaft.

9. The article dispensing device for an automatic vending machine according to claim 8, wherein both an upper portion and a lower portion of the shiftable plate are provided with a pair of positioning lugs, and stepped positioning edges with which the positioning lugs engage, are formed in an upper portion and a lower portion of the side walls of the frame.

10. The article dispensing device for an automatic vending machine according to claim 1, wherein the shiftable plate means comprises an upper shiftable plate and a lower shiftable plate disposed below the upper shiftable plate.

11. The article dispensing device for an automatic vending machine according to claim 10, wherein the lower shiftable plate has a height greater than that of the upper shiftable plate, the positioning lugs of the lower shiftable plate is provided in an upper portion and a lower portion thereof, and stepped positioning edges engaging with the positioning lugs of the lower shiftable plate are formed in an upper and a lower portion of the side walls of the frame.

12. The article dispensing device for an automatic vending machine according to claim 1, wherein each of the slots for supporting the shiftable plate is an inclined stepped slot having steps corresponding to the steps of the stepped positioning edge.

* * * * *